United States Patent
Nomura

(10) Patent No.: US 10,301,424 B2
(45) Date of Patent: May 28, 2019

(54) POLYTHIOPHENE DERIVATIVE, SECONDARY CELL POSITIVE ELECTRODE ACTIVE MATERIAL, AND SECONDARY CELL

(71) Applicant: Masayoshi Nomura, Shizuoka (JP)

(72) Inventor: Masayoshi Nomura, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/435,883

(22) Filed: Feb. 17, 2017

(65) Prior Publication Data

US 2017/0158810 A1      Jun. 8, 2017

Related U.S. Application Data

(63) Continuation of application No. PCT/JP2015/072522, filed on Aug. 7, 2015.

(30) Foreign Application Priority Data

Aug. 19, 2014    (JP) .................................. 2014-167007

(51) Int. Cl.
    *H01M 4/60*     (2006.01)
    *C08G 61/12*     (2006.01)
    *H01M 10/0525*     (2010.01)

(52) U.S. Cl.
    CPC ........... *C08G 61/126* (2013.01); *C08G 61/12* (2013.01); *H01M 4/60* (2013.01); *H01M 4/608* (2013.01);
    (Continued)

(58) Field of Classification Search
    CPC ................ C08G 75/00; C08G 2261/43; C08G 2261/312; C08G 2261/145;
    (Continued)

(56) References Cited

U.S. PATENT DOCUMENTS

| 4,833,048 A | 5/1989 | Dejonghe et al. |
| 2004/0115529 A1 | 6/2004 | Nakahara et al. |

(Continued)

FOREIGN PATENT DOCUMENTS

| JP | 61-271746 | 12/1986 |
| JP | 2715778 | 11/1997 |

(Continued)

OTHER PUBLICATIONS

International Search Report dated Oct. 13, 2015 for counterpart International Patent Application No. PCT/JP2015/072522 filed Aug. 7, 2015.

(Continued)

*Primary Examiner* — Shane Fang
(74) *Attorney, Agent, or Firm* — Cooper & Dunham LLP

(57) ABSTRACT

Provided is a polythiophene derivative including a repeating unit represented by general formula (1) below.

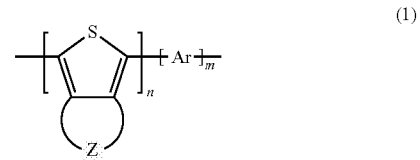

(1)

In general formula (1), Z represents a group of atoms forming a 5-through 9-membered heterocycle containing a chalcogen element as a ring member. When the group of atoms contains a plurality of chalcogen elements, the kinds of the chalcogen elements may be the same or different. Ar represents an aromatic ring or aromatic heterocycle that may (Continued)

contain a substituent. n represents a natural number of 2 or greater. m represents 0 or a natural number of 2 or greater.

11 Claims, 14 Drawing Sheets

(52) U.S. Cl.
CPC ..... *H01M 10/0525* (2013.01); *C08G 2261/11* (2013.01); *C08G 2261/145* (2013.01); *C08G 2261/146* (2013.01); *C08G 2261/148* (2013.01); *C08G 2261/1424* (2013.01); *C08G 2261/3243* (2013.01)

(58) Field of Classification Search
CPC ...... C08G 2261/1424; C08G 2261/514; C08G 2261/3223; H01M 4/608; H01M 10/0565
See application file for complete search history.

(56) References Cited

U.S. PATENT DOCUMENTS

| | | | |
|---|---|---|---|
| 2009/0127491 A1 | 5/2009 | Kakiuchi et al. | |
| 2009/0203873 A1* | 8/2009 | Sotzing | C08G 61/126 528/380 |
| 2013/0165614 A1* | 6/2013 | Amb | C07D 495/04 528/8 |

FOREIGN PATENT DOCUMENTS

| | | |
|---|---|---|
| JP | 2002-304996 | 10/2002 |
| JP | 2010-080343 | 4/2010 |
| JP | 2012-146839 | 8/2012 |
| JP | 2013-056906 | 3/2013 |
| JP | 2014-214245 | 11/2014 |
| WO | WO2015/115158 A1 | 8/2015 |

OTHER PUBLICATIONS

Chemical Physics Letters, 359, (2002) 351-354.
Nature Materials, 10, (2011) 947-951.
Shuai Chan, et al., Systematic study on chemical oxidative and solid-state polymerization of poly(3,4-ethylenedithiathiophene), Journal of Polymer Science Part A: Polymer Chemistry, 50, 2012, p. 1987-1978.
Shuai Chen, et al., Preparation and characterization of aqueous dispersions of poly(3,4-ethylenedithiathiophene-co-3,4-ethylenedioxythiophene)/poly(styrene sulfonate) and their conducting films, Journal of Applied Polymer Science, 2013, 129(4), p. 1717-1725.
Baoyang Lu, et al., Electrosynthesis of poly(3,4-ethylenedithiathiophene) in an ionic liquid and its electrochemistry and electrochromic properties, Electrochimica Acta, 106, 2013, p. 201-208.
Xin Chen, et al., Synthesis of polythienylenevinylene copolymers bearing carbondithioate structures, Synthetic Metals, 159(14), 2009, p. 1464-1466.
Jul. 3, 2018 Japanese official action in connection with corresponding Japanese patent application No. 2014-167007.
Peter J. Skabara et al., "Novel Terthiopene and Bis(thienyl)furan Derivatives as Precursors to Highly Electroactive Polymers", J. Org. Chem, 1999, 64(17), p. 6418-6424.
Jing Tang et al., "Poly[3,4-(ethylenedithio)thiopene]: High specific capacity cathode active material for lithium rechargeable batteries", Journal of Power Sources, Aug. 8, 2008, 185(2), p. 1434-1438.

* cited by examiner

POLYTHIOPHENE DERIVATIVE, SECONDARY CELL POSITIVE ELECTRODE ACTIVE MATERIAL, AND SECONDARY CELL

CROSS-REFERENCE TO RELATED APPLICATIONS

The present application is a continuation application of International Application No. PCT/JP2015/072522, filed Aug. 7, 2015, which claims priority to Japanese Patent Application No. 2014-167007, filed Aug. 19, 2014. The contents of these applications are incorporated herein by reference in their entirety.

BACKGROUND OF THE INVENTION

Field of the Invention

The present invention relates to a polythiophene derivative, and a secondary cell positive electrode active material using the polythiophene derivative and a secondary cell.

Description of the Related Art

Cells extract electric energy by converting chemical energy to electric energy utilizing oxidation-reduction reaction occurring at positive electrodes and negative electrodes, or store electric energy by undergoing a reverse process. Cells are used in various devices as power supplies.

Along with the recent rapid expansion of the market for notebook personal computers, smart phones, and so forth, there are increasing needs for drastic improvement of energy density and output density of the secondary cells used in these devices. Besides, in order to alleviate the difficulty in the power situation since the Great East Japan Earthquake, development of large-scale large-capacity secondary cells is highly hoped for. In order to meet this demand, secondary cells using alkali metal ion such as lithium ion as a charge carrier to utilize electrochemical reactions upon charge exchange by the charge carrier are being strenuously developed.

However, most electrode materials for positive electrodes (positive electrode active materials) of lithium ion secondary cells are poorer in discharge capacity (Ah/kg) than electrode materials for negative electrodes (negative electrode active materials). This is a large factor that hinders expansion of capacity of lithium ion secondary cells. Lithium ion secondary cells currently put on the market use metal oxides having high specific gravities as positive electrode active materials. Therefore, there is a problem that cell capacity per unit mass is not sufficient. Hence, attempts to develop large-capacity cells using more light-weight electrode materials are being explored.

For example, U.S. Pat. No. 4,833,048 and Japanese Patent No. 2715778 disclose cells using organic compounds having disulfide bond as positive electrode active materials. These cells function as secondary cells by letting the disulfide bond undergo 2-electron reduction during discharging to cleave the sulfide bond and let it react with metal ions in the electrolyte and change to two metal thiolates, and by letting the two thiolates undergo 2-electron oxidation and return to sulfide during charging. Because these secondary cells use organic compounds mainly containing elements having low specific gravities such as sulfur and carbon as electrode materials, these secondary cells are effective to a certain degree in terms of configuring large-capacity cells having a high energy density. However, there is a problem that efficiency of recombination of the dissociated disulfide bond is poor, so stability in the charging state or discharging state is insufficient.

As cells using organic compounds likewise as active materials, Japanese Examined Patent Publication No. 07-85420 discloses a cell using a polypyrrole complex and Japanese Unexamined Patent Application Publication No. 2002-304996 discloses a cell using a nitroxyl radical compound as a positive electrode active material. Japanese Unexamined Patent Application Publication No. 2002-304996 describes piperidyl group-containing high-molecular-weight polymers and copolymers as the nitroxyl radical compound.

Chemical Physics Letters, 359, (2002) 351-354 discloses a secondary cell using 2,2,6,6-tetramethyl piperidinoxyl-7-yl methacrylate (PTMA) as a positive electrode active material.

However, there is a problem that only a certain amount or less of charges can be injected into or discharged from conductive polymers such as polypyrrole because generated charges spread in the polymers to cause a strong Coulomb repulsion between charges. The nitroxy radical compound has an advantage of being able to obtain a large current because charge exchange at the electrode is rapid. However, the nitroxy radical compound is not suitable for expansion of capacity of secondary cells because the nitroxy radical compound undergoes oxidation-reduction reaction at a rate of one electrode per molecule.

Japanese Unexamined Patent Application Publication No. 2010-80343 and Nature Materials, 10, (2011) 947-951 disclose secondary cells using low-molecular-weight organic compounds having a multiple-stage redox ability as active materials. However, because of the low-molecular-weight compounds, which have high capacity densities though, these secondary cells have problems such as degradation of cell performances due to elution of the low-molecular-weight compounds into the electrolytes. Resolution of the problems is demanded.

When mounting an electrode formed of a current collector and an electrode layer in a secondary cell, the electrode layer needs to have a certain degree of flexibility in order that the electrode layer can be prevented from being detached from the current collector. Generally, a binder resin is mixed in producing an electrode layer in order to impart flexibility to the electrode layer. However, increase of the amount of the binder resin in the electrode layer is accompanied by decrease of the amount of the active material, to lower the capacity of the secondary cell. Therefore, it is demanded to provide an electrode having flexibility in the film even with a small amount of a binder resin.

SUMMARY OF THE INVENTION

A polythiophene derivative of the present invention as a means of solving the problems described above contains a repeating unit represented by general formula (1) below.

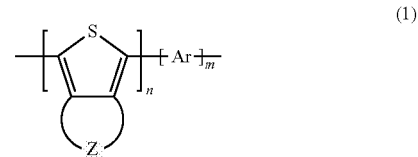

(1)

In general formula (1), Z represents a group of atoms forming a 5-through 9-membered heterocycle containing a chalcogen element as a ring member. When the group of atoms contains a plurality of chalcogen elements, the kinds of the chalcogen elements may be the same or different. Ar represents an aromatic ring that may contain a substituent or an aromatic heterocycle that may contain a substituent. n represents a natural number of 2 or greater. m represents 0 or a natural number of 2 or greater.

DESCRIPTION OF THE EMBODIMENTS

Polythiophene Derivative

Figure 1:
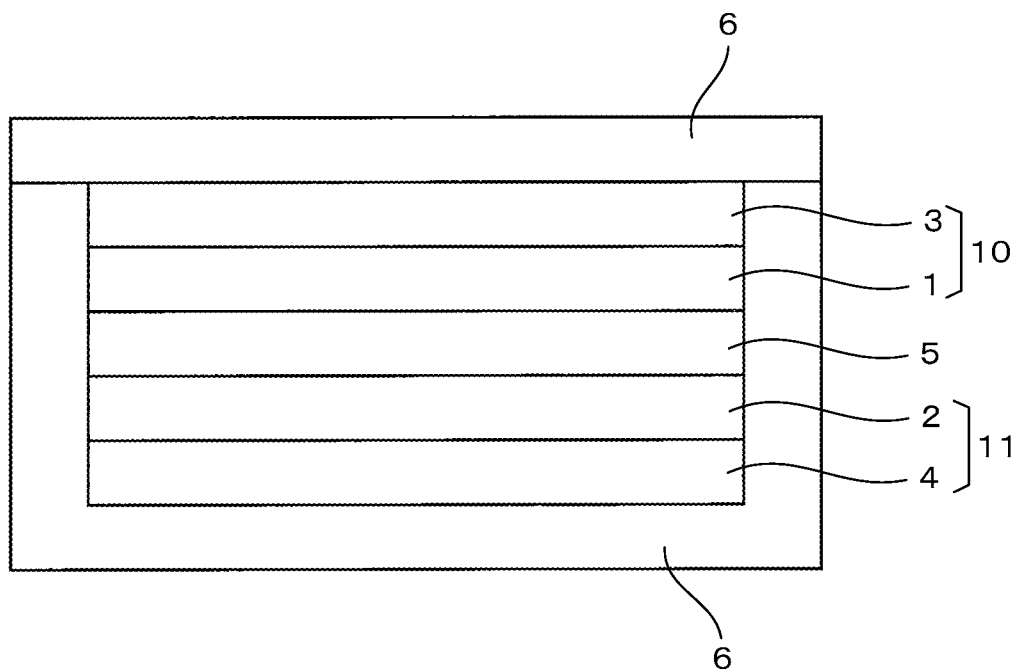
FIG. 1 is a schematic cross-sectional view illustrating an example of a secondary cell.

A polythiophene derivative of the present invention contains a repeating unit represented by general formula (1) below.

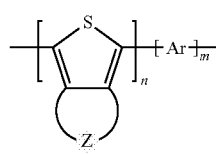

(1)

In general formula (1), Z represents a group of atoms forming a 5-through 9-membered heterocycle containing a chalcogen element as a ring member. When the group of atoms contains a plurality of chalcogen elements, the chalcogen elements may be the same or different. Ar represents an aromatic ring that may contain a substituent or an aromatic heterocycle that may contain a substituent. n represents a natural number of 2 or greater. m represents 0 or a natural number of 2 or greater.

The polythiophene derivative containing the repeating unit represented by general formula (1) is a stabilized redox compound, is useful for producing a secondary cell using as an electrode active material, an organic compound that causes an oxidation-reduction reaction in at least either process of a charging reaction and a discharging reaction, and is particularly preferable for use as a positive electrode active material.

With this, a secondary cell having a high energy density and a good cyclic property can be obtained. The secondary cell has a stable charge-discharge cycle and a long life span, because the redox compound is stabilized. Moreover, an electrode layer can be provided with a good flexibility and can be prevented from being detached from a current collector.

The present invention has an object to provide a polythiophene derivative that can prevent an electrode layer from being detached from a current collector and is useful for producing a secondary cell having a high energy density and a good cyclic property.

The present invention can provide a polythiophene derivative that can prevent an electrode layer from being detached from a current collector and is useful for producing a secondary cell having a high energy density and a good cyclic property.

In general formula (1), Z represents a group of atoms forming a 5-through 9-membered heterocycle containing a chalcogen element as a ring member. When the group of atoms contains a plurality of chalcogen elements, the chalcogen elements may be the same or different. The chalcogen element is not particularly limited and may be appropriately selected depending on the intended purpose. The chalcogen element is preferably O element, S element, Se element, and Te element, and more preferably O element, S element, and Se element.

Ar represents an aromatic ring that may contain a substituent or an aromatic heterocycle that may contain a substituent. Examples of the aromatic ring include benzene, biphenyl, naphthalene, anthracene, fluorene, and pyrene, or derivatives of these aromatic rings.

Examples of the aromatic heterocycle include pyridine, quinoline, thiophene, furan, oxazole, oxadiazole, and carbazole, or derivatives of these aromatic heterocycles.

Among these aromatic heterocycles, thiophene and thiophene derivatives are preferable.

Examples of the substituent of the aromatic ring or the aromatic heterocycle include: alkyl groups such as a methyl group, an ethyl group, an isopropyl group, and a butyl group; alkoxy groups such as a methoxy group, an ethoxy group, a propoxy group, and a butoxy group; and halogen atoms such as a fluorine atom, a chlorine atom, a bromine atom, and an iodine atom.

n represents a natural number of 2 or greater and preferably from 10 through 100. m represents 0 or a natural number of 2 or greater and preferably from 10 through 100.

The polythiophene derivative containing the repeating unit represented by general formula (1) is preferably a polythiophene derivative containing a repeating unit represented by general formula (2) below.

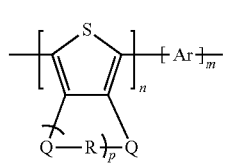

(2)

In general formula (2), R represents a substituted or unsubstituted alkylene group or a substituted or unsubstituted branched alkylene group. p represents a natural number of 1 or greater. Q represents a chalcogen element. Ar, n, and m represent the same meanings as in general formula (1).

In general formula (2), R represents a substituted or unsubstituted alkylene group or a substituted or unsubstituted branched alkylene group. Examples of a group to be substituted in these alkylene groups include an alkyl group, an alkoxy group, an aryl group, an aryloxy group, a halogen atom, a thioalkyl group, an arylthio group, an alkylamino group, and an arylamino group. Examples of the alkyl group include a methyl group, an ethyl group, an isopropyl group, and a butyl group. Examples of the alkoxy group include groups of which alkyl moiety is the alkyl group. Examples of the aryl group include a phenyl group, a 4-toluyl group, a 4-hydroxyphenyl group, a 1-naphthyl group, and a 2-naphthyl group. Examples of the aryloxy group include groups of which aryl moiety is the aryl group. Examples of the halogen atom include fluorine, chlorine, and bromine. Examples of the thioalkyl group include a methylthio group, an ethylthio group, and a butylthio group. Examples of the arylthio group include a phenylthio group. Examples of the alkylamino group include a diethylamino group, a dimethylamino group, and a hydroxyamino group. Examples of the arylamino group include a diphenylamino group and a phenylnaphthylamino group.

p is a natural number of 1 or greater indicative of the number of repeating units, and represents a number of from 1 through 3.

Q represents a chalcogen element, and the same as in general formula (1) applies.

The polythiophene derivative containing the repeating unit represented by general formula (1) is preferably a polythiophene derivative containing a repeating unit represented by general formula (3) below.

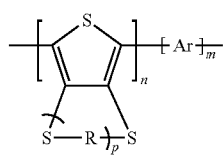

(3)

In general formula (3), R represents a substituted or unsubstituted alkylene group or a substituted or unsubstituted branched alkylene group. p represents a natural number of 1 or greater. Ar, n, and m represent the same meanings as in general formula (1).

R and p in general formula (3) are the same as in general formula (2).

The polythiophene derivative containing the repeating unit represented by general formula (1) is preferably a polythiophene derivative containing a repeating unit represented by general formula (4) below.

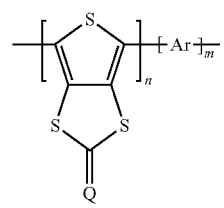

(4)

In general formula (4), Q represents a chalcogen element. Ar, n, and m represent the same meanings as in general formula (1).

Q in general formula (4) represents a chalcogen element, and the same as in general formula (1) applies.

Specific examples of the polythiophene derivative containing the repeating unit represented by general formula (1) are presented below as non-limiting examples. In the formulae, n represents a natural number of 2 or greater, and m represents 0 or a natural number of 2 or greater.

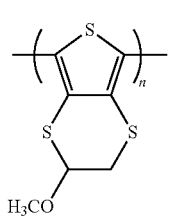

(1)

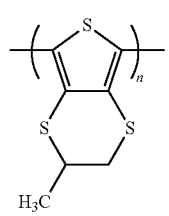

(2)

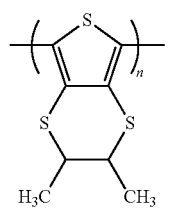

(3)

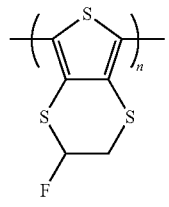

(4)

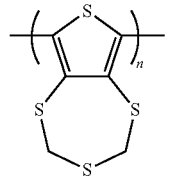

(5)

(6)
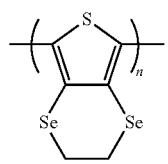
(7)
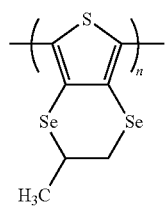
(8)
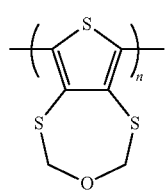
(9)
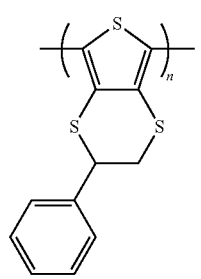
(10)
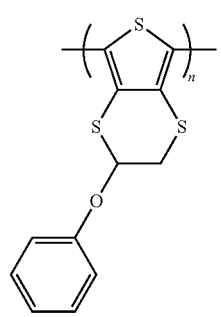
(11)
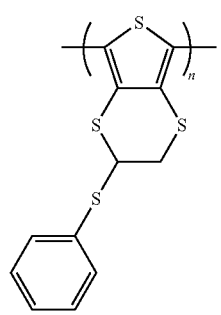
(12)
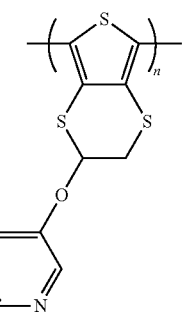
(13)
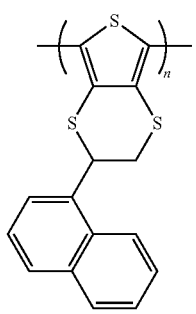
(14)
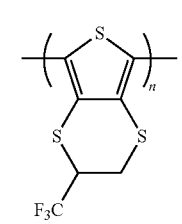
(15)
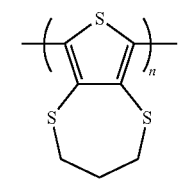
(16)
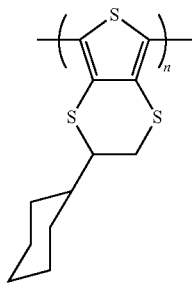
(17)
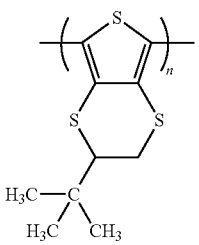

(18) 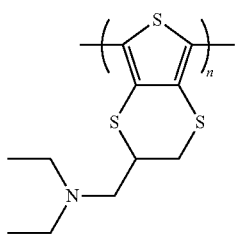
(19) 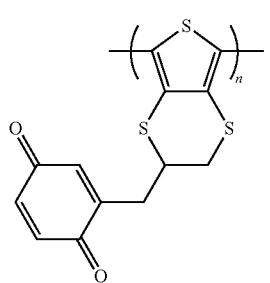
(20) 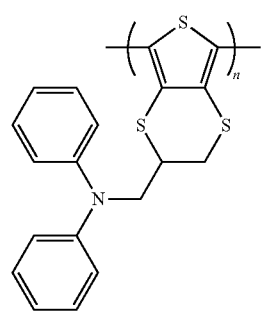
(21) 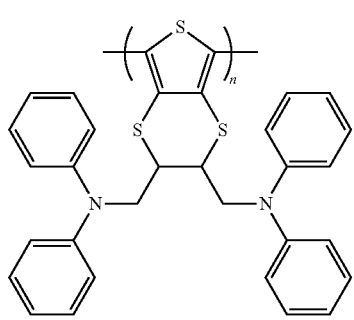
(22) 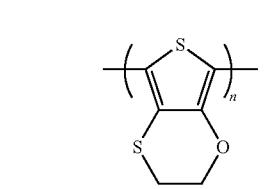
(23) 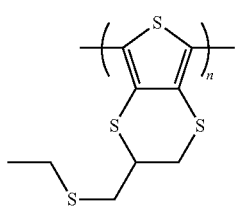
(24) 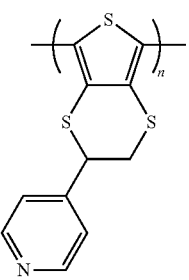
(25) 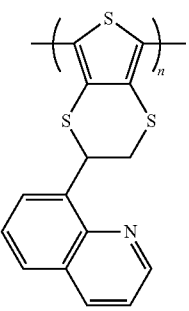
(26) 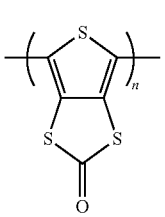
(27) 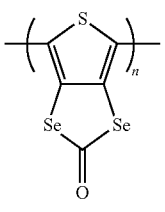
(28) 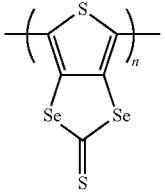
(29) 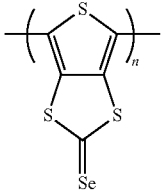
(30) 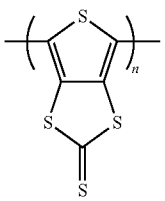

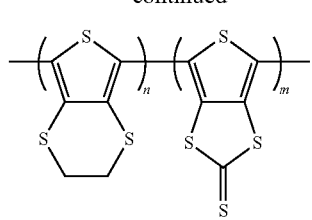

Among the example compounds of the polythiophene derivative containing the repeating unit represented by general formula (1), the example compounds 2, 3, 4, 5, 8, 10, 11, 16, 26, 32, 36, and 44 are particularly preferable in terms of discharge capacity level and easy synthesizability.

The polythiophene derivative containing the repeating unit represented by general formula (1) can be obtained by polymerizing a thiophene derivative obtained according to reaction formula A or B below.

The thiophene derivative represented by general formula (5) below can be synthesized by a method described in Synthetic Communications 28 (12), 2237-2244 (1998). That is, the thiophene derivative can be obtained from a nucleophilic substitution reaction between an alkoxy-substituted thiophene such as 3,4-dimethoxythiophene and a chalcogen element source such as dithiols and diols using an acid catalyst. The reaction temperature is preferably from 0 degree C. through 150 degrees C. and more preferably from 50 degrees C. through 130 degrees C. As the acid catalyst, for example, an acid (bronsted acid) such as sulfuric acid, hydrochloric acid, phosphoric acid, methanesulfonic acid, trichloroacetic acid, trifluoroacetic acid, and p-toluenesulfonic acid is used. As a reaction solvent, for example, toluene, xylene, anisole, tetralin, methylcyclohexane, ethylcyclohexane, chlorobenzene, or orthodichlorobenzene is used.

The thiophene derivative represented by formula (6) below can be synthesized by a method described in Journal of Materials Chemistry 8 (8), 1719-1724 (1998). That is, the thiophene derivative can be obtained by cyclizing a bromo form of thione using sodium sulfide nonahydrate and then oxidating the resultant using 2,3-dichloro-5,6-dicyano-1,4-benzoquinone (DDQ). The reaction temperature in the cyclization is preferably from 0 degree C. through 100 degrees C. and more preferably from 10 degrees C. through 40 degrees C. The reaction temperature in the oxidation is preferably from 0 degree C. through 150 degrees C. and more preferably from 80 degrees C. through 130 degrees C.

[Reaction formula A]

General formula (5)

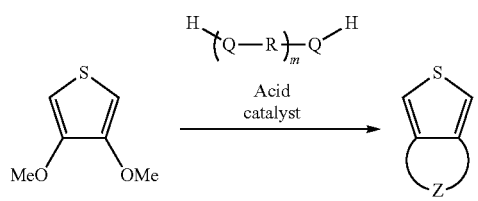

In the formula, Me represents a methyl group and Z represents a group of atoms forming a 5-through 9-membered heterocycle containing a chalcogen element as a ring member. When the group of atoms contains a plurality of chalcogen elements, the chalcogen elements may be the same or different.

[Reaction formula B]

General formula (6)

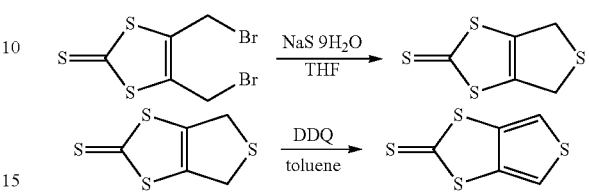

Polymerization for obtaining the polythiophene derivative can be performed by oxidative coupling polymerization using an oxidant. Examples of the oxidant include iron (III) chloride and metal salts of aromatic sulfonic acids.

Examples of the metal salts of aromatic sulfonic acids include ferric o-toluenesulfonate, ferric m-toluenesulfonate, ferric p-toluenesulfonate, cupric o-toluenesulfonate, cupric m-toluenesulfonate, cupric p-toluenesulfonate, cobalt o-toluenesulfonate, cobalt m-toluenesulfonate, cobalt p-toluenesulfonate, manganese o-toluenesulfonate, manganese m-toluenesulfonate, manganese p-toluenesulfonate, ferric o-ethylbenzenesulfonate, ferric m-ethylbenzenesulfonate, ferric p-ethylbenzenesulfonate, and ferric naphthalenesulfonate, or derivatives of these metal salts of aromatic sulfonic acids.

Examples of a solvent for polymerization include: alcohol-based solvents such as methanol, ethanol, and butanol; halogenated hydrocarbons such as chloroform, dichloromethane, and 1,2-dichloroethane; aromatic hydrocarbons such as toluene, xylene, anisole, chlorobenzene, orthodichlorobenzene, and nitrobenzene; acetonitrile; and benzonitrile. One of these solvents may be used alone or two or more of these solvents may be used in combination.

(Secondary Cell Positive Electrode Active Material)

The polythiophene derivative of the present invention is used as a secondary cell positive electrode active material of the present invention.

(Secondary Cell)

A secondary cell of the present invention is a secondary cell including a positive electrode, a negative electrode, and an electrolyte and including as an electrode active material, an organic compound that causes an oxidation-reduction reaction in at least either of a charging process and a discharging process. The organic compound is the polythiophene derivative of the present invention.

<Positive Electrode and Negative Electrode>

The positive electrode is formed of a positive electrode current collector and a positive electrode layer containing a positive electrode active material. The negative electrode is formed of a negative electrode current collector and a negative electrode layer containing a negative electrode active material.

<<Positive Electrode Layer and Negative Electrode Layer>>

The electrode layers are formed of an electrode layer for a positive electrode and an electrode layer for a negative electrode. Each electrode layer contains an electrode active material, preferably contains a binding agent and a conduction assisting agent, and further contains other components as needed.

The polythiophene derivative of the present invention can be used as the electrode active material for any of the positive electrode and the negative electrode. However, from a viewpoint of an energy density of a material commonly used as the negative electrode, it is particularly preferable to use the polythiophene derivative as the positive electrode active material.

When the polythiophene derivative of the present invention is used as the positive electrode active material, examples of the negative electrode active material include graphite, amorphous carbon, lithium metal, lithium alloys, lithium ion occluding carbon, and conductive polymers. One of these negative electrode active materials may be used alone or two or more of these negative electrode active materials may be used in combination.

The shape of the electrode layer is not particularly limited and may be appropriately selected depending on the intended purpose. For example, in the case of lithium metal, a thin-film shape, a bulk shape, a shape obtained by solidifying powder, a fibrous shape, and a flake shape may be used.

When the polythiophene derivative of the present invention is used as the negative electrode active material, for example, metal oxide particles, disulfide compounds, nitroxy radical compounds, and conductive polymeric compounds are used as the positive electrode active material. Examples of the metal oxide include lithium manganates or lithium manganates having a spinel structure such as $LiMnO_2$, $LiNi_{0.5}Mn_{1.5}O_4$, and $Li_xMn_2O_4$ ($0<x<2$), layered compounds such as $LiCoO_2$, $LiNiO_2$, and $LiNi_{1/3}Co_{1/3}Mn_{1/3}O_2$, and phosphate-based compounds such as $LiFePO_4$, $LiCoPO_4$, and $LiNiPO_4$.

Examples of the disulfide compounds include dithioglycol, 2,5-dimercapto-1,3,4-thiadiazole, and S-triazine-2,4,6-trithiol.

Examples of the conductive polymers include polyacetylene, polyphenylene, polythiophene, polyaniline, and polypyrrole.

One of these positive electrode layer materials may be used alone or two or more of these positive electrode layer materials may be used in combination. These materials may be mixed with hitherto known active materials to be used as composite active materials.

When producing the positive electrode using the polythiophene derivative of the present invention, it is possible to use other substances than the polythiophene derivative of the present invention, such as a metal oxide or a redox compound in combination.

Examples of the metal oxide include: lithium manganates or lithium manganates having a spinel structure such as $LiMnO_2$, $LiNi_{0.5}Mn_{1.5}O_4$, and $Li_xMn_2O_4$ ($0<x<2$); layered compounds such as $LiCoO_2$, $LiNiO_2$, and $LiNi_{1/3}Co_{1/3}Mn_{1/3}O_2$; and phosphate-based compounds such as $LiFePO_4$, $LiCoPO_4$, and $LiNiPO_4$.

Examples of the redox compound include organic compounds such as oxy redox compounds, nitroxyl redox compounds, nitrogen redox compounds, carbon redox compounds, and boron redox compounds.

Examples of the redox compound include, but are not limited to, compounds represented by general formulae (R-1) to (R-12) below. In the formulae, n is a natural number indicative of the number of repeating units.

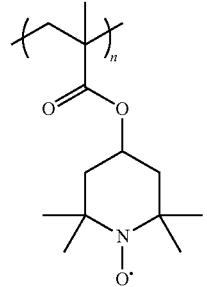

(R-1)

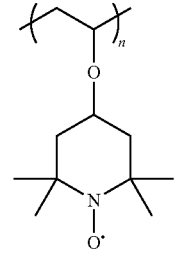

(R-2)

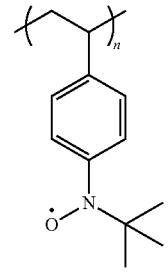

(R-3)

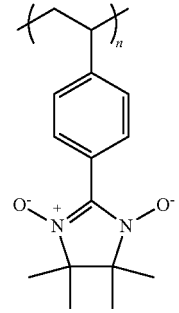

(R-4)

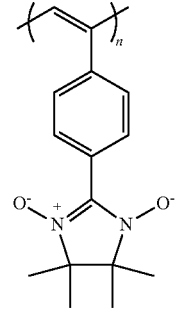

(R-5)

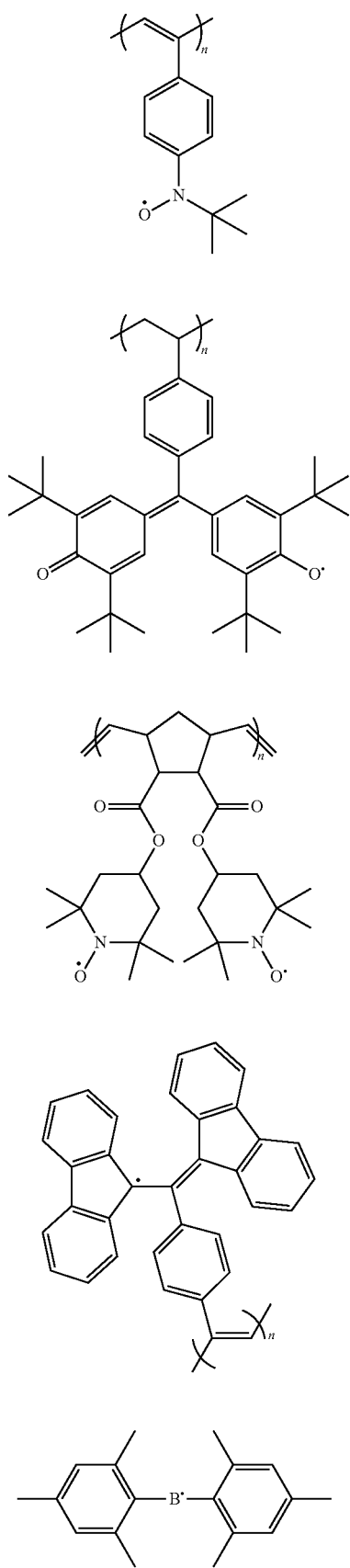

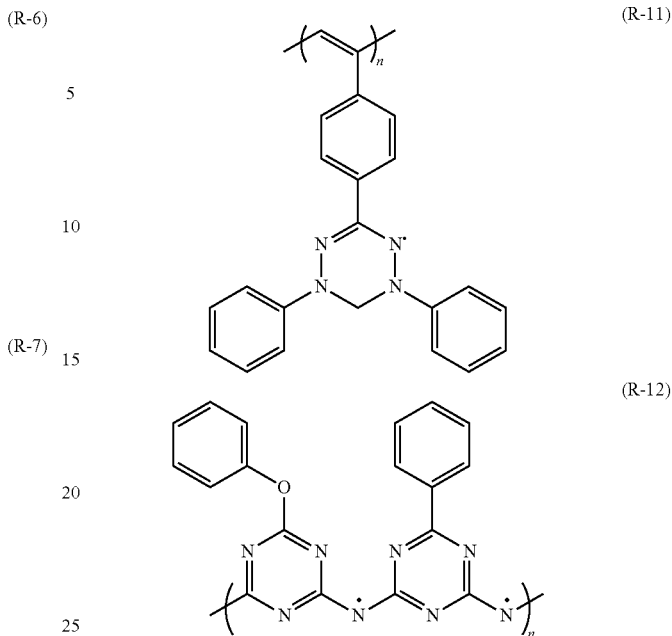

—Binding Agent—

When using the polythiophene derivative as the positive electrode active material, it is possible to use a binding agent in order to strengthen binding between the constituent materials. Examples of the binding agent include resin binders such as polyvinylidene fluoride, vinylidene fluoride-hexafluoropropylene copolymers, vinylidene fluoride-tetrafluoroethylene copolymers, styrene-butadiene copolymer rubbers, polypropylene, polyethylene, polyimide, and various polyurethanes.

—Conduction Assisting Agent—

The conduction assisting agent is contained in order to assist in electron exchange between the current collector and the electrode active material.

The conduction assisting agent is not particularly limited and ay be appropriately selected depending on the intended purpose. Examples of the conduction assisting agent include: fullerene such as $C_{60}$ and $C_{70}$; nanocarbons such as single-layer carbon nanotube, multi-layer carbon nanotube, and graphene; carbon blacks such as Ketjen black and acetylene black; graphite; activated carbon having a large specific surface area; mesoporous carbon; and vapor-grown carbon fiber. One of these conduction assisting agents may be used alone or two or more of these conduction assisting agents may be used in combination.

The content of the conduction assisting agent is not particularly limited, may be appropriately selected depending on the intended purpose, and is preferably from 100 parts by mass through 800 parts by mass relative to 100 parts by mass of the binding agent.

<Positive Electrode Current Collector and Negative Electrode Current Collector>

The current collectors are members formed of conductive materials and capable of collecting charges arising from the electrodes of the cell and include a positive electrode current collector and a negative electrode current collector.

The shape, size, and structure of the current collectors are not particularly limited and may be appropriately selected depending on the intended purpose.

The material of the current collectors is not particularly limited and may be appropriately selected depending on the intended purpose. Examples of the material of the current collectors include foils of metals such as nickel, aluminum, copper, gold, silver, aluminum alloys, and stainless, metal flat plates, mesh electrodes, and carbon electrodes. The electrode active materials and the current collectors may be chemically bonded with each other.

<Electrolyte>

The electrolyte is a material configured to perform charge carrier transfer between both of the electrodes: the negative electrode layer and the positive electrode layer. Typically, the electrolyte has an ionic conductivity of from $10^{-5}$ S/cm through $10^{-1}$ S/cm at room temperature.

For example, an electrolytic solution obtained by dissolving an electrolyte salt in a solvent can be used as the electrolyte. Examples of the electrolyte salt include $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

Examples of the solvent of the electrolyte salt include ethylene carbonate, propylene carbonate, dimethyl carbonate, diethyl carbonate, methylethyl carbonate, γ-butyrolactone, tetrahydrofuran, dioxolane, sulfolane, dimethylformamide, dimethylacetamide, and N-methyl-2-pyrrolidone. One of these solvents may be used alone or two or more of these solvents may be used in combination.

Furthermore, in the present invention, the electrolyte may be a solid electrolyte.

Examples of polymeric compounds used as the solid electrolyte include: vinylidene fluoride-based polymers such as polyvinylidene fluoride, vinylidene fluoride-hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers, and vinylidene fluoride-hexafluoropropylene-tetrafluoroethylene terpolymers; acrylnitrile-based polymers such as acrylonitrile-methyl methacrylate copolymers, acrylonitrile-methyl acrylate copolymers, acrylonitrile-ethyl methacrylate copolymers, acrylonitrile-ethyl acrylate copolymers, acrylonitrile-methacrylic acid copolymers, acrylonitrile-acrylic acid copolymers, and acrylonitrile-vinyl acetate copolymers; and polymers such as polyethylene oxide, ethylene oxide-propylene oxide copolymers, and acrylate forms and methacrylate forms of these polymers. The solid electrolyte used may be a gel state obtained by impregnating these polymeric compounds with an electrolytic solution or the polymeric compounds as is.

<Separator>

The separator is provided between the positive electrode and the negative electrode in order to prevent short-circuiting between the positive electrode and the negative electrode.

The material of the separator is not particularly limited and may be appropriately selected depending on the intended purpose. Examples of the material of the separator include paper, cellophane, polyolefin non-woven fabric, polyamide non-woven fabric, and glass fiber non-woven fabric. Examples of the paper include craft paper, vinylon mixed paper, and synthetic pulp mixed paper.

The shape of the separator is not particularly limited and may be appropriately selected depending on the intended purpose. Examples of the shape of the separator include a sheet shape.

The structure of the separator may be a single-layer structure or a laminated structure.

The size of the separator is not particularly limited and may be appropriately selected depending on the intended purpose.

It is also preferable to configure the separator to contain an electrolyte. When using a solid electrolyte such as an ion-conductive polymer as the electrolyte, it is also possible not to provide the very separator.

<Outer Container>

The material of the outer container is not particularly limited and may be appropriately selected depending on the intended purpose. Examples of the material of the outer container include copper, stainless steel, and metals such as stainless steel or iron plated with, for example, nickel.

The shape of the outer container is not particularly limited and may be appropriately selected depending on the intended purpose. Examples of the shape of the outer container include a shape of a shallow dish having a warped rim, a bottomed circular-cylindrical shape, and a bottomed rectangular cylindrical shape.

The structure of the outer container may be a single-layer structure or a laminated structure. Examples of the laminated structure include a three-layer structure including layers of nickel, stainless steel, and copper.

The size of the outer container is not particularly limited and may be appropriately selected depending on the intended purpose.

The method for producing the secondary cell of the present invention is not particularly limited and may be appropriately selected depending on the intended purpose. The secondary cell is produced by laminating the positive electrode, the negative electrode, and the nonaqueous electrolytic solution, and a separator to be used as needed, in a manner that these members form an appropriate shape. It is also possible to use any other constituent member such as an outer can as needed. The method for laminating the positive electrode and the negative electrode is not particularly limited and may be appropriately selected from methods commonly employed. Examples of the method include multi-layer lamination of the positive electrode and the negative electrode, combination of current collectors having the positive electrode or the negative electrode laminated on both surfaces, and winding of the positive electrode and the negative electrode.

The shape of the secondary cell is not particularly limited and may be appropriately selected depending on the intended purpose. Examples of the shape of the secondary cell include a coin shape, a circular-cylindrical shape, a rectangular shape, a sheet shape, and a button shape.

FIG. 1 is a schematic cross-sectional view illustrating an example of the secondary cell of the present invention. A negative electrode 10 of the secondary cell includes a negative electrode current collector 3 and a negative electrode layer 1 containing a negative electrode active material. A positive electrode 11 of the secondary cell includes a positive electrode current collector 4 and a positive electrode layer 2 containing a positive electrode active material. The secondary cell includes a separator 5 containing an electrolyte between the positive electrode 11 and the negative electrode 10.

As illustrated in FIG. 1, the secondary cell of the present invention includes an outer container 6 in which the negative electrode current collector 3, the negative electrode layer 1, the separator 5 containing the electrolyte, the positive electrode layer 2, and the positive electrode current collector 4 are laminated in this order.

—Applications—

For example, the secondary cell of the present invention is suitable as a lithium ion secondary cell.

Applications of the secondary cell are not particularly limited, and the secondary cell may be used for various applications. Examples of the applications include power supplies and backup power supplies for notebook personal computers, pen-input personal computers, mobile personal computers, smartphones, electronic book players, portable phones, portable facsimile machines, portable photocopiers, portable printers, stereo headphones, videocams, liquid crystal television sets, handy cleaners, portable CDs, mini disks, transceivers, electronic organizers, calculators, memory cards, portable tape recorders, radios, motors, lighting devices, toys, game consoles, clocks, stroboscopes, and cameras.

EXAMPLES

The present invention will be described more specifically below by way of Examples and Comparative Examples. However, the present invention should not be construed as being limited to the Examples.

Synthesis Example 1

Synthesis of ethylene dithiothiophene (EDTT)

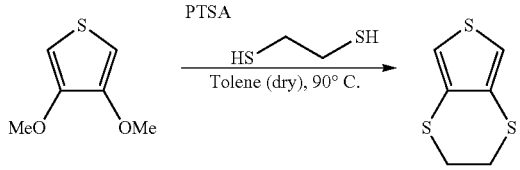

[Reaction formula 1]

In reaction formula 1, Me represents a methyl group and PTSA represents p-toluenesulfonic acid.

p-Toluenesulfonic acid monohydrate (1.77 g) (9.29 mmol) and toluene (1,100 mL) were put in a 2,000 mL four-necked flask, and subjected to reflux dehydration under an argon (Ar) gas stream with a Dean-Stark trap and a condenser attached on the flask. After reflux dehydration was performed for 90 minutes, the resultant was naturally cooled. When the resultant reached around room temperature, 3,4-dimethoxythiophene (19.13 g) (132.7 mmol) and ethanedithiol (50.0 g) (530.8 mmol) were put in the flask, and the materials were allowed to undergo a reaction with a bath temperature adjusted such that the internal temperature would be 90 degrees C.

The reaction was tracked with a HPLC [available from Tosoh Corporation, PD-8020 HIGH-PRESSURE GRADIENT HPLC, with a column (available from GL Science Inc., ODS-3, with a diameter of 4.6 mm×250 mm) and a mobile phase (tetrahydrofuran/water=6/4 (v/v)] at a flow rate of (1.0 mL/min)). When the raw materials substantially disappeared, the reaction was stopped, followed by cooling and then separation with water (200 mL)×3, sodium bicarbonate water (200 mL)×2, and water (200 mL)×2, to concentrate an organic layer in a draft and obtain a brown oil. The brown oil was refined by column chromatography (silica (400 g), Tol/hex=1/2), to obtain the intended product in a white turbid oil state (15.0 g) (86.05 mmol, at a yield of 64.8%).

Synthesis Example 2

Synthesis of monomethyl EDTT

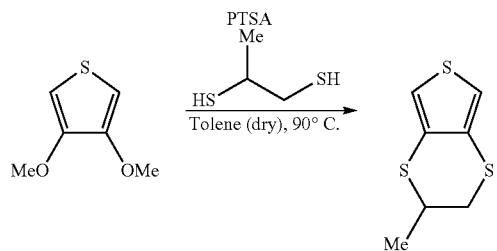

[Reaction formula 2]

In the reaction formula 2, Me represents a methyl group and PTSA represents p-toluenesulfonic acid.

p-Toluenesulfonic acid monohydrate (0.23 g) (1.2 mmol) and toluene (140 mL) were put in a 300 mL four-necked flask, and subjected to reflux dehydration under an argon (Ar) gas stream with a Dean-Stark trap and a condenser attached on the flask. After reflux dehydration was performed for 90 minutes, the resultant was naturally cooled. When the resultant reached around room temperature, 3,4-dimethoxythiophene (2.4 g) (16.6 mmol) and 1,2-propanedithiol (7.58 g) (66.4 mmol) were put in the flask, and the materials were allowed to undergo a reaction with a bath temperature adjusted such that the internal temperature would be 90 degrees C.

After termination of the reaction was confirmed with the HPLC (the same as in Synthesis example 1), the resultant was cooled, followed by separation with water (50 mL)×3, sodium bicarbonate water (50 mL)×2, and water (50 mL)×2, to concentrate an organic layer in a draft and obtain a brown oil. The brown oil was refined by silica gel column chromatography (silica (100 g), Tol/n-hex=1/2), to obtain the intended product in a slightly yellow oil state (2.78 g) (14.76 mmol, at a yield of 88.9%).

Synthesis Example 3

Synthesis of dimethyl EDTT

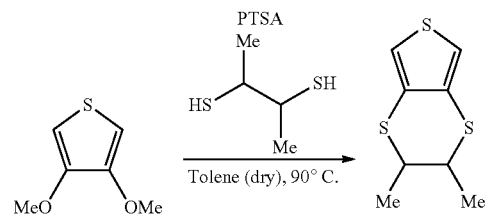

[Reaction formula 3]

In reaction formula 3, Me represents a methyl group and PTSA represents p-toluenesulfonic acid.

p-Toluenesulfonic acid monohydrate (0.23 g) (1.2 mmol) and toluene (140 mL) were put in a 300 mL four-necked flask, and subjected to reflux dehydration under an argon (Ar) gas stream with a Dean-Stark trap and a condenser attached on the flask. After reflux dehydration was performed for 90 minutes, the resultant was naturally cooled. When the resultant reached around room temperature, 3,4-dimethoxythiophene (2.4 g) (16.6 mmol) and 2,3-butanedithiol (8.3 g) (66.4 mmol) were put in the flask, and the materials were allowed to undergo a reaction with a bath temperature adjusted such that the internal temperature would be 90 degrees C. The system gradually became a lightly black green color.

After termination of the reaction was confirmed with the HPLC (the same as in Synthesis example 1), the resultant was cooled, followed by separation with water (50 mL)×3, sodium bicarbonate water (50 mL)×2, and water (50 mL)×2, to concentrate an organic layer and obtain a brown oil. The brown oil was refined by silica gel column chromatography (silica (125 g), Tol/n-hex=1/2), to obtain the intended product in a transparent oil state (2.05 g) (10.1 mmol, at a yield of 60.8%).

Synthesis Example 4

Synthesis of 3,4-diethylsulfide dithiothiophene

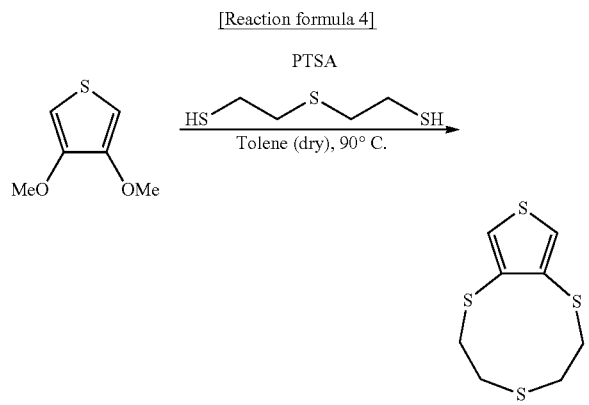

In reaction formula 4, Me represents a methyl group and PTSA represents p-toluenesulfonic acid.

p-Toluenesulfonic acid monohydrate (0.23 g) (1.2 mmol) and toluene (140 mL) were put in a 300 mL four-necked flask, and subjected to reflux dehydration under an argon (Ar) gas stream with a Dean-Stark trap and a condenser attached on the flask. After reflux dehydration was performed for 90 minutes, the resultant was naturally cooled. When the resultant reached around room temperature, 3,4-dimethoxythiophene (2.4 g) (16.6 mmol) and bis(2-mercaptoethyl)sulfide (10.8 g) (66.4 mmol) were put in the flask, and the materials were allowed to undergo a reaction with a bath temperature adjusted such that the internal temperature would be 90 degrees C.

After termination of the reaction was confirmed with the HPLC (the same as in Synthesis example 1), the resultant was cooled, followed by separation with water (50 mL)×3, sodium bicarbonate water (50 mL)×2, and water (50 mL)×2, to concentrate an organic layer in a draft and obtain a brown oil. The brown oil was refined by silica gel column chromatography (silica (200 g), Tol/n-hex=1/2), to obtain the intended product in a slightly yellow oil state (2.67 g) (11.3 mmol, at a yield of 68.6%).

Synthesis Example 5

Synthesis of thieno[3,4-d]-1,3-dithiol-2-thione

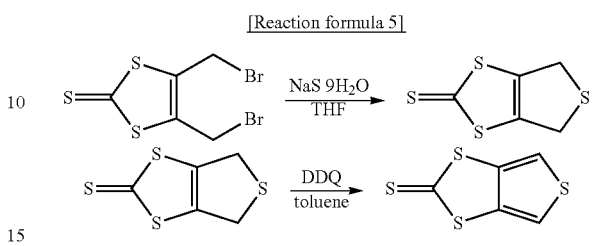

Ethanol (200 mL) was put in a 1 L four-necked flask and stirred while a dibromo form represented by reaction formula 5 (2.0 g) (6.25 mmol), a mixture solution of ethanol (50 mL) and tetrahydrofuran (THF) (200 mL), sodium sulfide nonahydrate (1.5 g) (6.25 mmol), and a mixture solution of water (200 mL) and ethanol (EtOH) (50 mL) were dropped at room temperature simultaneously. After dropping was completed, the materials were stirred for 30 minutes, to concentrate the solvent. The obtained concentrate was extracted 3 times with dichloromethane (150 mL). The dichloromethane layer was concentrated, to obtain an orange crude product. The orange crude product was crystallized from n-hexane/toluene, to obtain an orange acicular crystal (0.96 g) (5 mmol, at a yield of 80.0%).

Subsequently, the orange acicular crystal (2.64 g) (13.7 mmol) was dissolved in toluene (120 mL) and stirred, while DDQ (2,3-dichloro-5,6-dicyano-1,4-benzoquinone) (3.43 g) (15.1 mmol) was added. Subsequently, the temperature was raised to a reflux temperature and the materials were allowed to undergo a reaction for 30 minutes. Then, the reaction solution was concentrated, extracted 3 times with dichloromethane (100 mL), and further concentrated, to obtain a crude product. This crude product was crystallized from ethyl acetate/n-hexane, to obtain the intended product, which was a yellow crystal (0.41 g) (7.4 mmol, at a yield of 54.0%).

Polymerization Example 1

Synthesis of Compound (2)

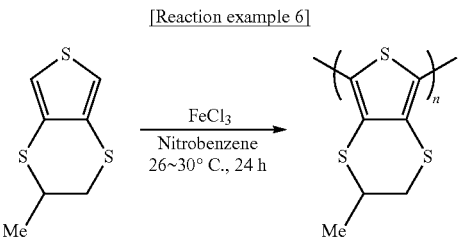

In reaction formula 6, Me represents a methyl group and n represents a natural number of 2 or greater.

Figure 2:
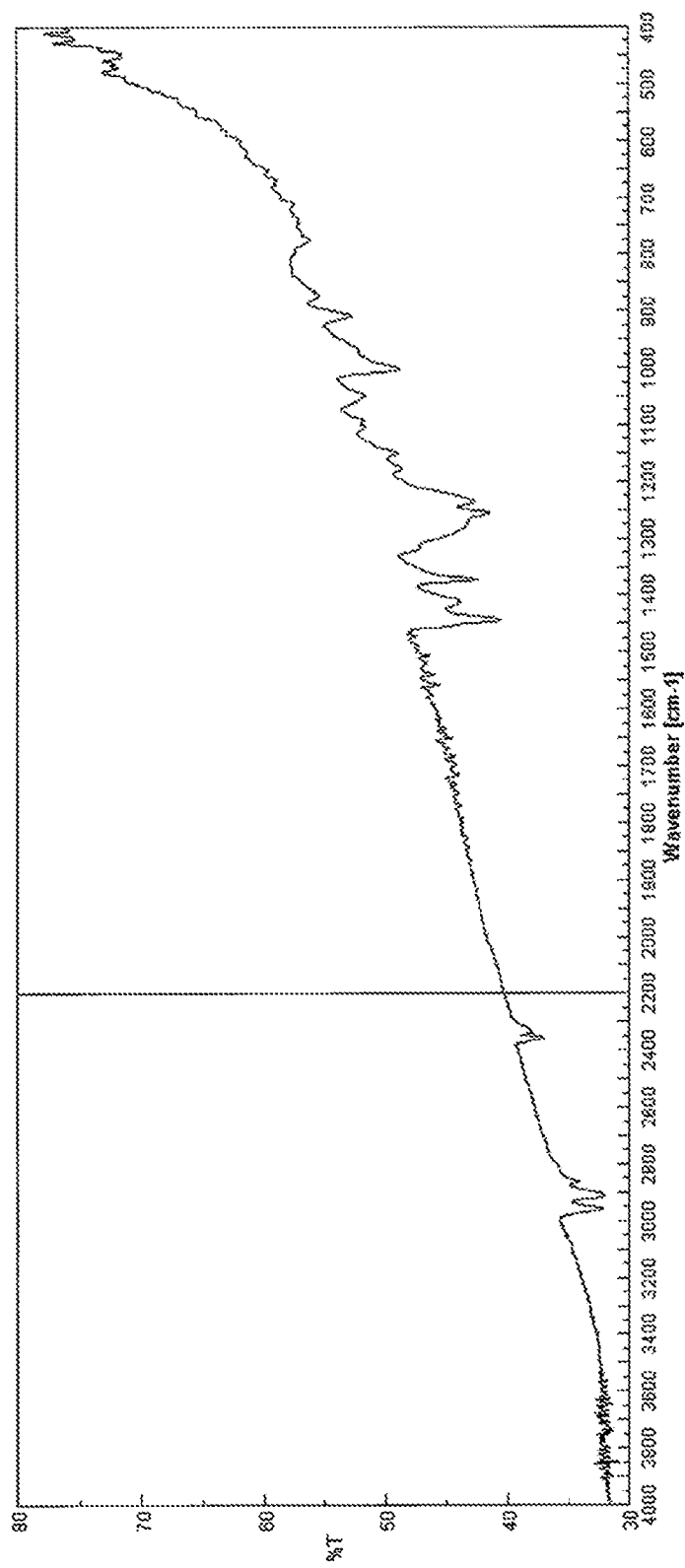
FIG. 2 is a diagram plotting an IR spectrum of a compound (2)
Figure 14:
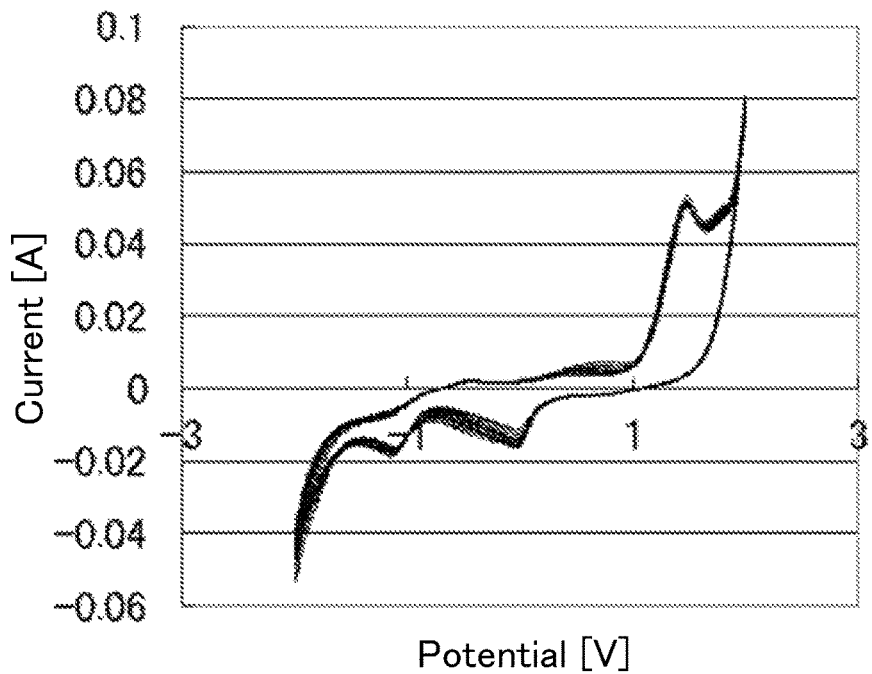
FIG. 14 is a diagram plotting measurement results of cyclic voltammetry of the compound (2)

Anhydrous iron (III) chloride (0.52 g) (3.2 mmol) and nitrobenzene (10 mL) were put in a 25 mL four-necked flask and stirred under an argon (Ar) gas stream, while monomethyl EDTT (0.15 g) (0.80 mmol) and nitrobenzene (3 mL)

were dropped. After dropping was completed, the materials were stirred at from 26 degrees C. through 30 degrees C. for 24 hours and the obtained reaction solution was fed to methanol (260 mL). A precipitated solid was filtrated, washed with methanol (50 mL), and dried at reduced pressure. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (2) (0.14 g) (at a yield of 93%). FIG. 2 plots a FT-IR spectrum of the compound. FIG. 14 plots measurement results of cyclic voltammetry of the compound.

The FT-IR spectrum was measured using FT-IR 670PLUS available from JASCO Corporation. Measurement was performed in the same manner in the following examples.

Cyclic voltammetry measurement was performed with an electrochemical gauge HSV-100 available from Hokuto Denko Corp. Measurement was performed in the same manner in the following examples.

The obtained brown solid, which was the compound (2), was insoluble in organic solvents (dichloromethane, acetonitrile, ethylene carbonate, propylene carbonate, dimethyl carbonate, diethyl carbonate, methyl ethyl carbonate, and γ-butyrolactone) commonly used as electrolytic solutions. With insolubility in these organic solvents, the active material can be prevented from being eluted into the electrolyte in charge-discharge cycles of the secondary cell. Therefore, for achieving stable charge-discharge cycles of the secondary cell, the fact relating to the solubility property matters.

Polymerization Example 2

Synthesis of Compound (3)

[Reaction formula 7]

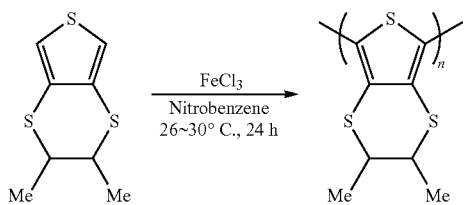

In reaction formula 7, Me represents a methyl group and n represents a natural number of 2 or greater.

Figure 3:
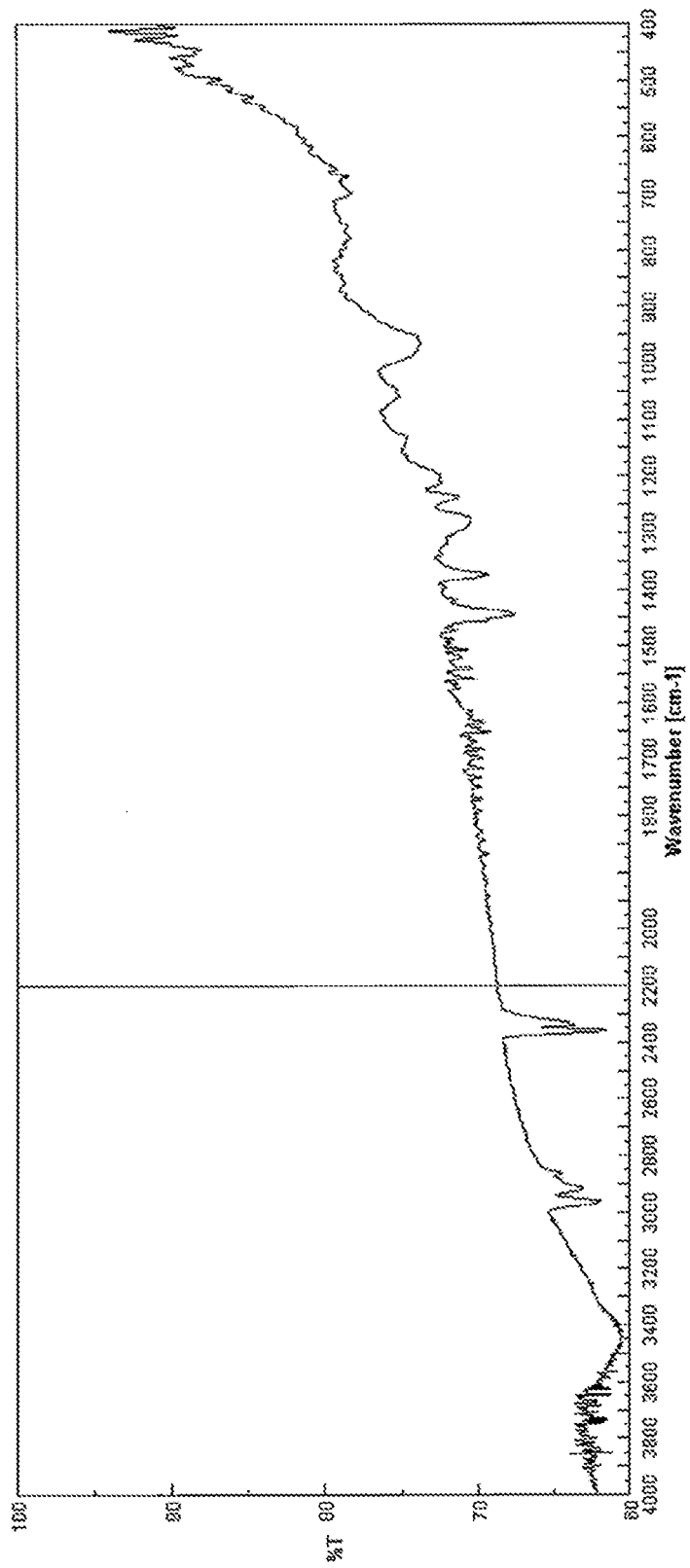
FIG. 3 is a diagram plotting an IR spectrum of a compound (3)

Anhydrous iron (III) chloride (0.48 g) (4×0.74=2.96 mmol) and nitrobenzene (10 mL) were put in a 25 mL four-necked flask and stirred under an argon (Ar) gas stream, while dimethyl EDTT (0.15 g) (0.74 mmol) and nitrobenzene (4 mL) were dropped. After dropping was completed, the materials were stirred at from 26 degrees C. through 30 degrees C. for 24 hours and the obtained reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (3) (0.14 g) (at a yield of 93%). FIG. 3 plots a FT-IR spectrum of the compound.

As in the case of Polymerization example 1, the obtained brown solid, which was the compound (3), was insoluble in organic solvents commonly used as electrolytic solutions.

Polymerization Example 3

Synthesis of Compound (4)

[Reaction formula 8]

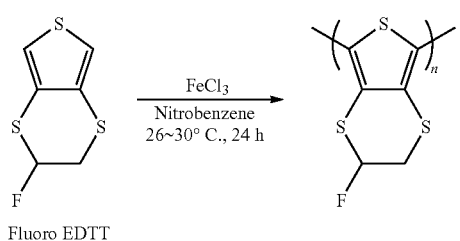

Fluoro EDTT

In reaction formula 8, n represents a natural number of 2 or greater.

Figure 4:
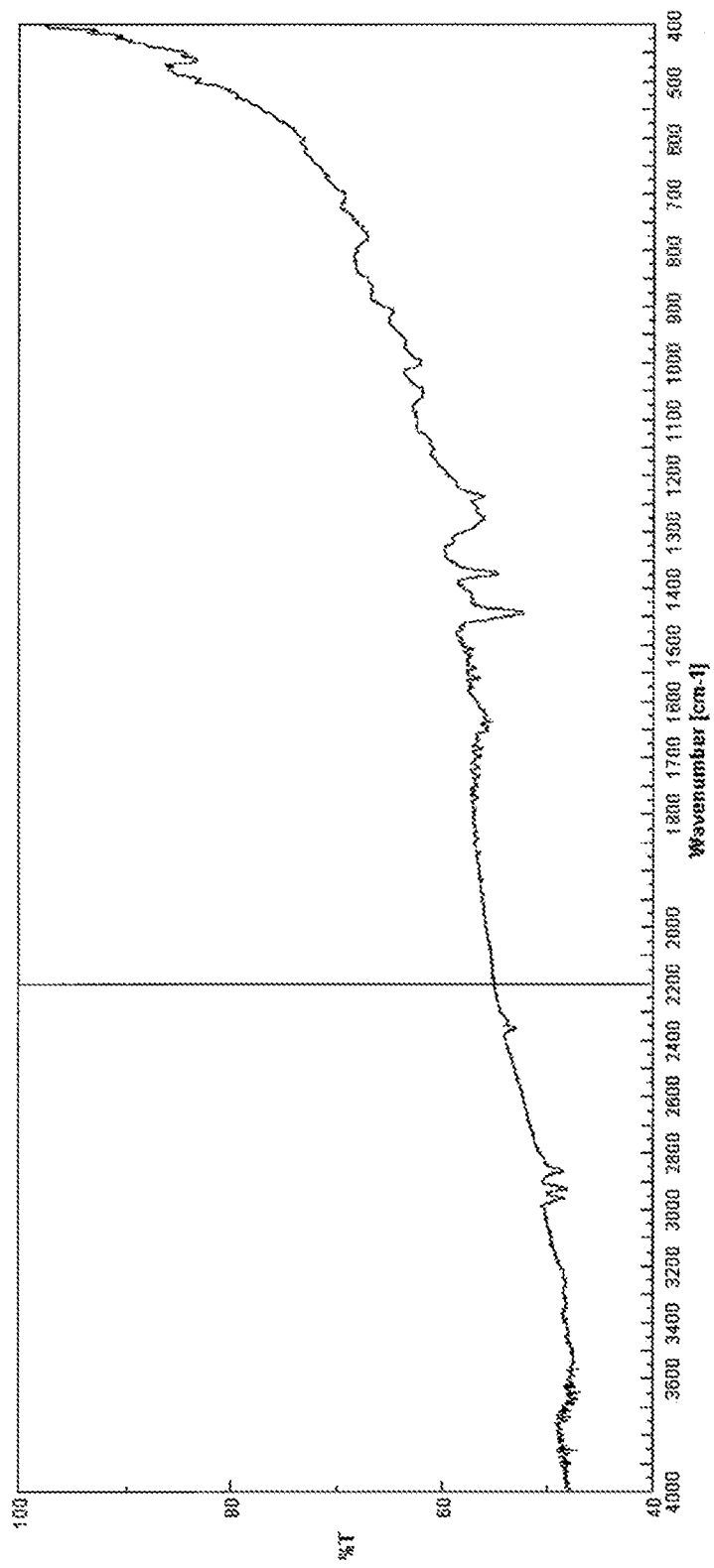
FIG. 4 is a diagram plotting an IR spectrum of a compound (4)

Anhydrous iron (III) chloride (0.51 g) (4×0.78=3.12 mmol) and nitrobenzene (10 mL) were put in a 25 mL four-necked flask and stirred under an argon (Ar) gas stream, while fluoro EDTT (0.15 g) (0.78 mmol) and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (4) (0.13 g) (at a yield of 87%). FIG. 4 plots a FT-IR spectrum of the compound.

As in the case of Polymerization example 1, the obtained brown solid, which was the compound (4), was insoluble in organic solvents commonly used as electrolytic solutions.

Polymerization Example 4

Synthesis of Compound (5)

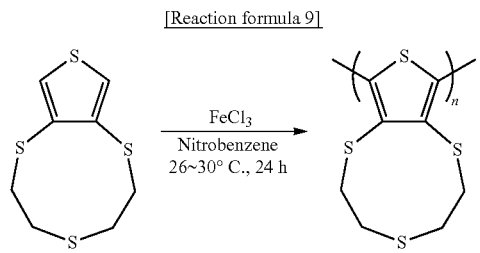

[Reaction formula 9]

In reaction formula 9, n represents a natural number of 2 or greater.

Figure 5:
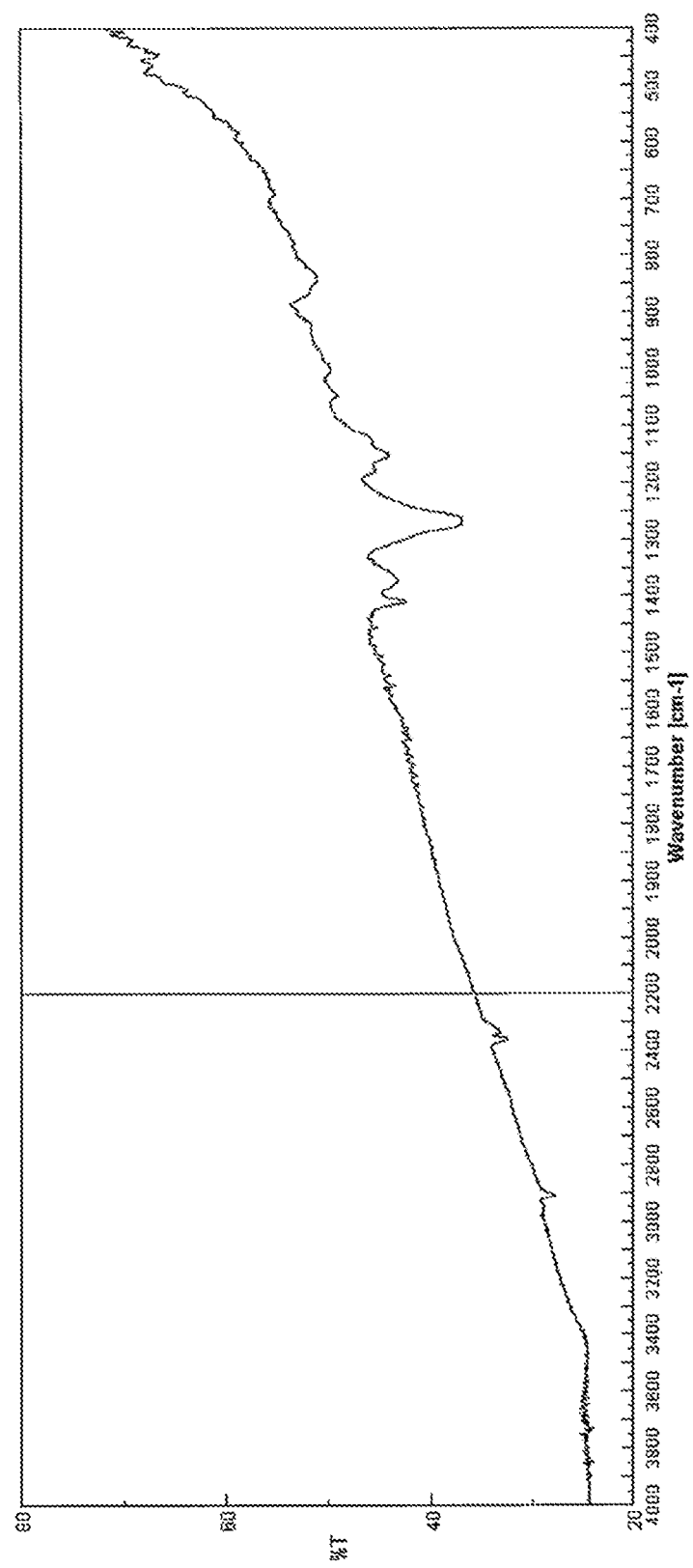
FIG. 5 is a diagram plotting an IR spectrum of a compound (5)

Anhydrous iron (III) chloride (0.45 g) (4×0.69=2.76 mmol) and nitrobenzene (10 mL) were put in a 25 mL four-necked flask and stirred under an argon (Ar) gas stream, while 3,4-diethylsulfide dithiothiophene (0.15 g) (0.69 mmol) and nitrobenzene (4 mL) were dropped. After dropping was completed, the materials were stirred at from 26 degrees C. through 30 degrees C. for 24 hours and the obtained reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (5) (0.13 g) (at a yield of 87%). FIG. 5 plots a FT-IR spectrum of the compound.

As in the case of Polymerization example 1, the obtained brown solid, which was the compound (5), was insoluble in organic solvents commonly used as electrolytic solutions.

Polymerization Example 5

Synthesis of Compound (8)

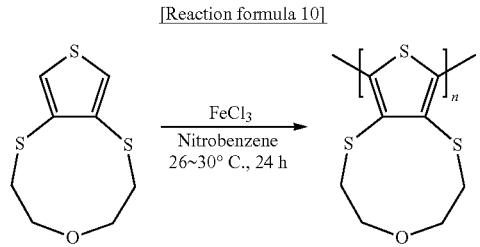

[Reaction formula 10]

In reaction formula 10, n represents a natural number of 2 or greater.

Figure 6:
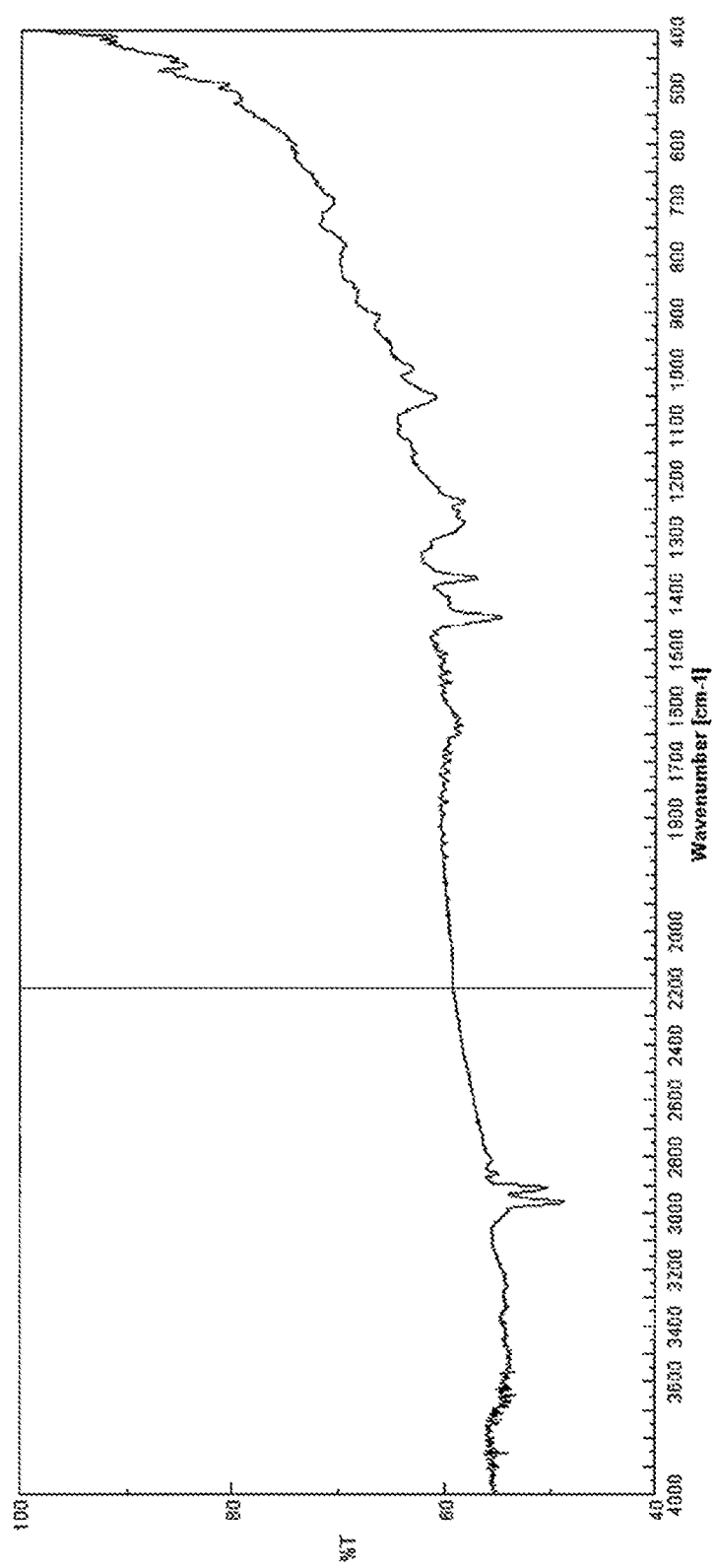
FIG. 6 is a diagram plotting an IR spectrum of a compound (8)

Anhydrous iron (III) chloride (0.48 g) (4×0.74=2.96 mmol) and nitrobenzene (10 mL) were put in a 25 mL four-necked flask and stirred under an argon (Ar) gas stream, while 3,4-diethylether dithiothiophene (0.15 g) (0.69 mmol) and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (8) (0.11 g) (at a yield of 73%). FIG. 6 plots a FT-IR spectrum of the compound.

As in the case of Polymerization example 1, the obtained brown solid, which was the compound (8), was insoluble in organic solvents commonly used as electrolytic solutions.

Polymerization Example 6

Synthesis of Compound (10)

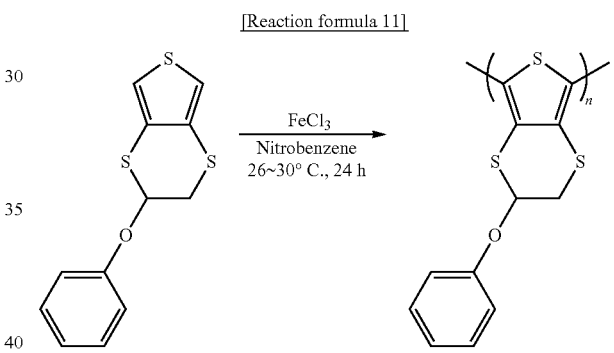

[Reaction formula 11]

In reaction formula 11, n represents a natural number of 2 or greater.

Figure 7:
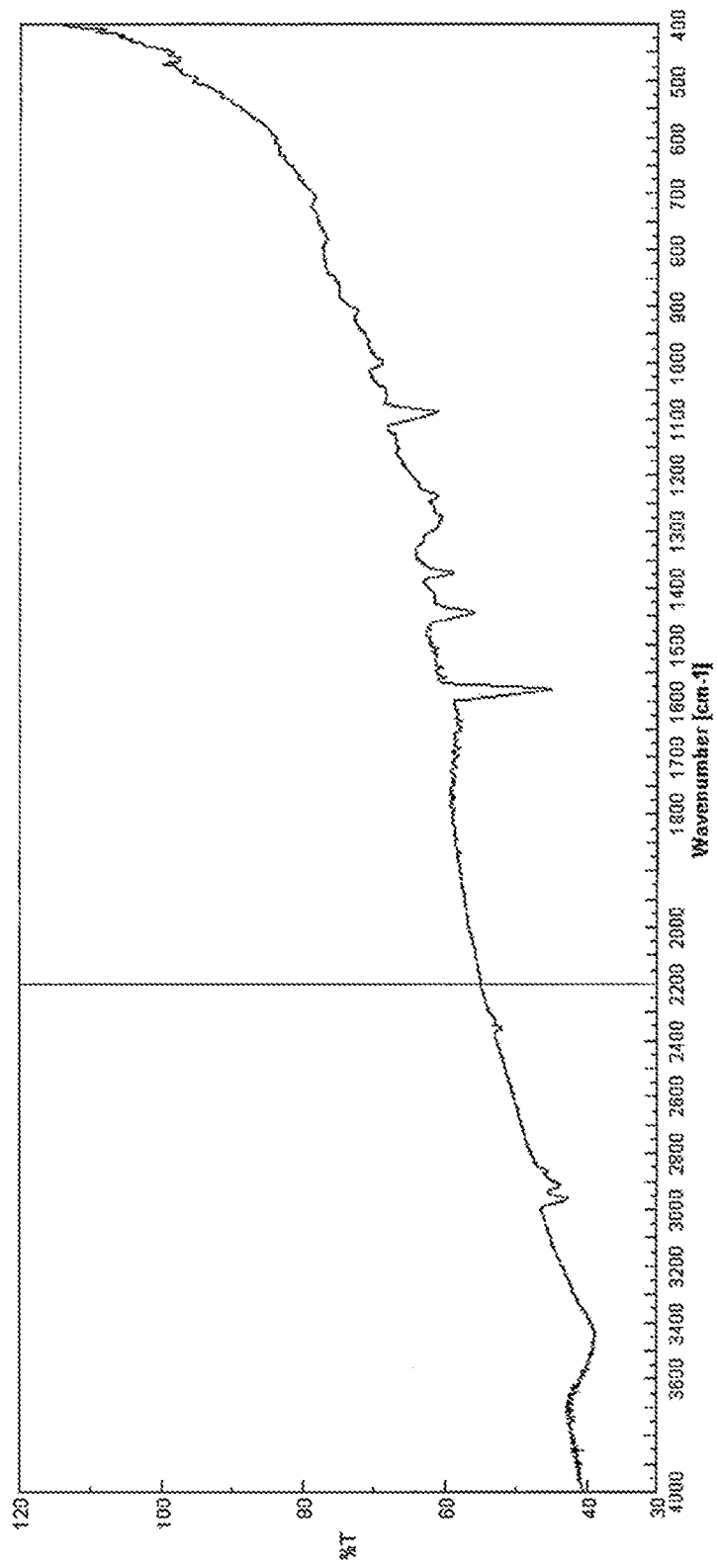
FIG. 7 is a diagram plotting an IR spectrum of a compound (10)

Anhydrous iron (III) chloride (0.36 g) (4×0.56=2.24 mmol) and nitrobenzene (10 mL) were put in a 25 mL four-necked flask and stirred under an argon (Ar) gas stream, while phenoxy EDTT (0.15 g) (0.56 mmol) and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (10) (0.14 g) (at a yield of 93%). FIG. 7 plots a FT-IR spectrum of the compound.

As in the case of Polymerization example 1, the obtained brown solid, which was the compound (10), was insoluble in organic solvents commonly used as electrolytic solutions.

Polymerization Example 7

Synthesis of Compound (11)

[Reaction formula 12]

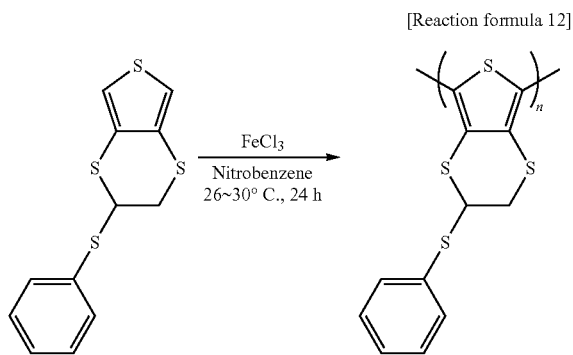

In reaction formula 12, n represents a natural number of 2 or greater.

Figure 8:
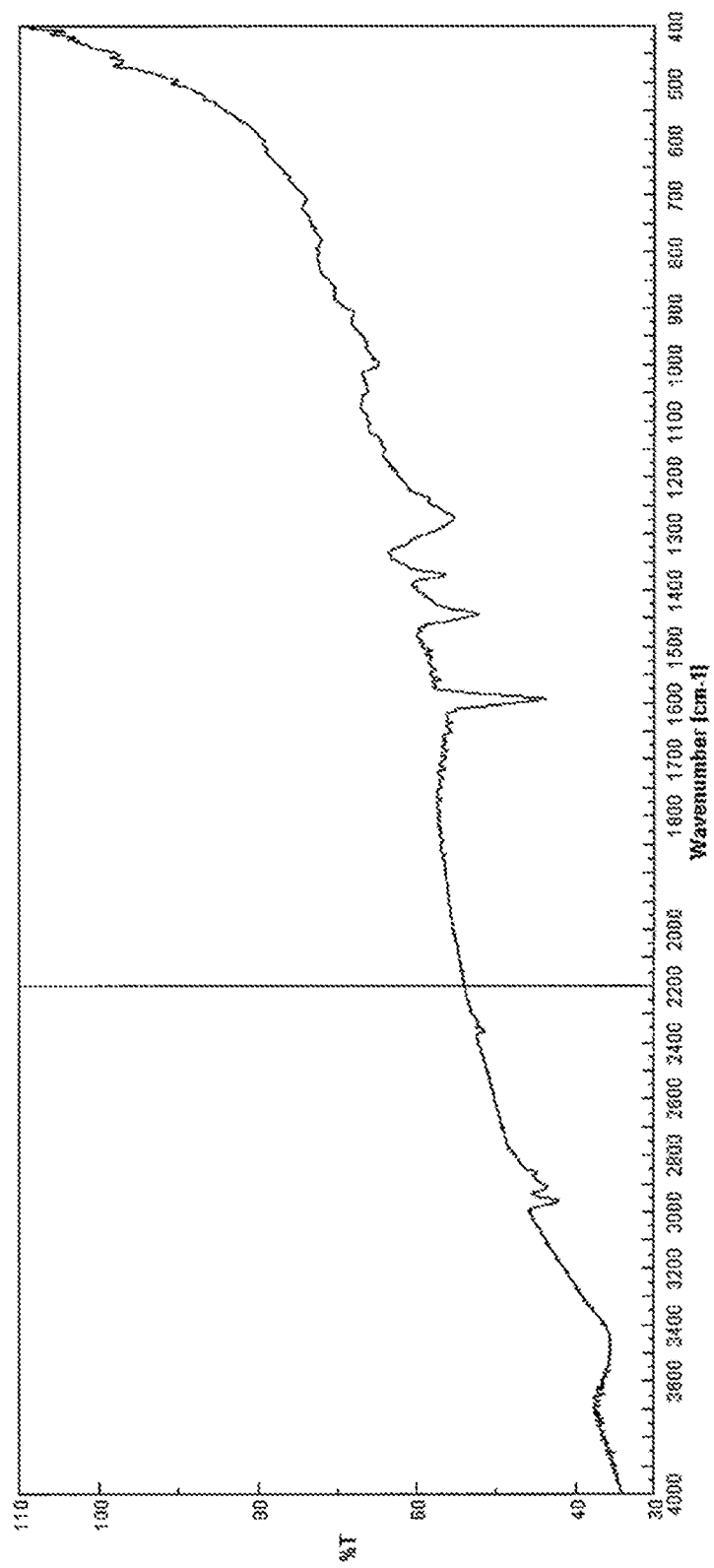
FIG. 8 is a diagram plotting an IR spectrum of a compound (11)

Anhydrous iron (III) chloride (0.48 g) (4×0.74=2.96 mmol) and nitrobenzene (10 mL) were put in a 25 mL four-necked flask and stirred under an argon (Ar) gas stream, while thiophenoxy EDTT (0.15 g) (0.53 mmol) and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (11) (0.12 g) (at a yield of 80%). FIG. 8 plots a FT-IR spectrum of the compound.

As in the case of Polymerization example 1, the obtained brown solid, which was the compound (11), was insoluble in organic solvents commonly used as electrolytic solutions.

Polymerization Example 8

Synthesis of Compound (16)

[Reaction formula 13]

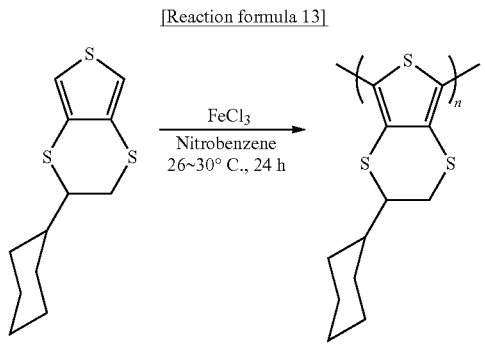

In reaction formula 13, n represents a natural number of 2 or greater.

Figure 9:
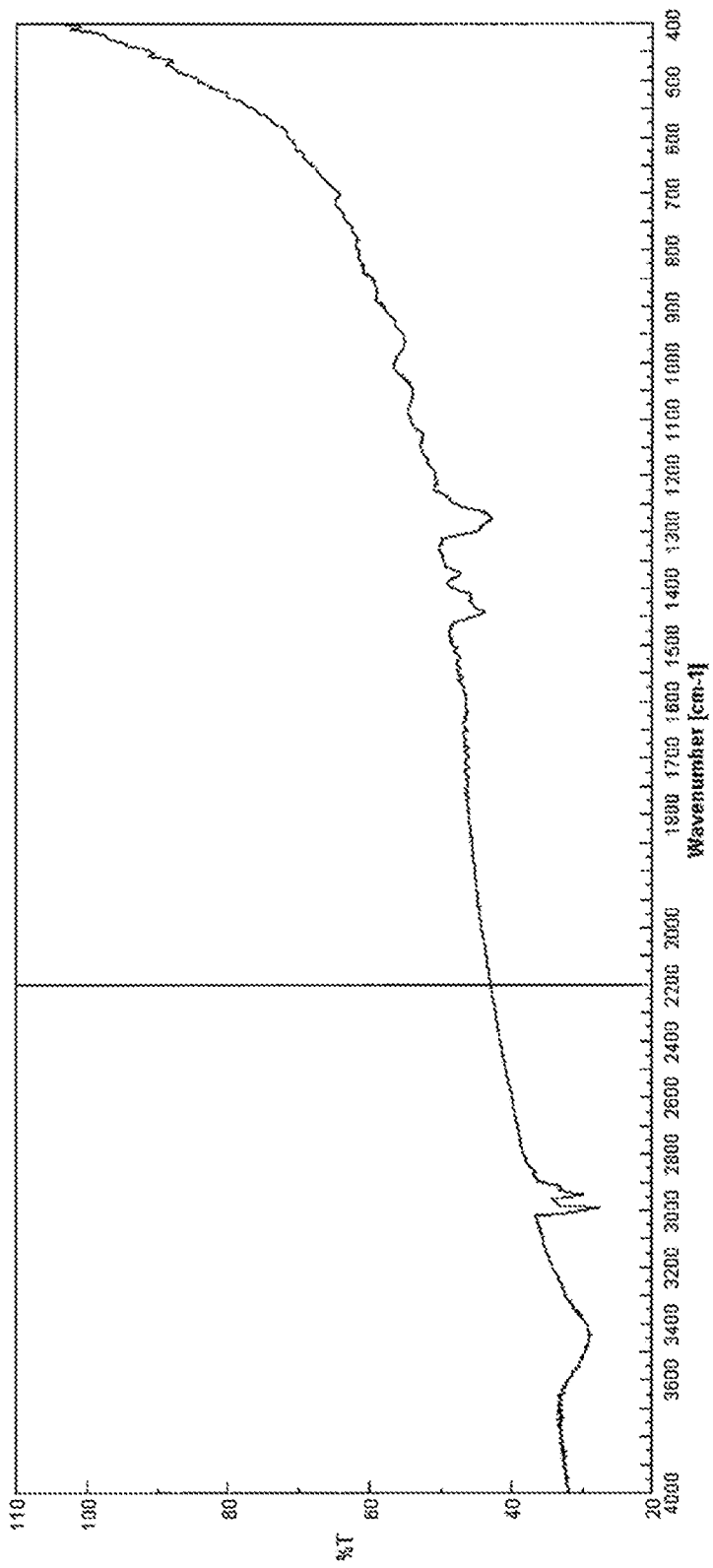
FIG. 9 is a diagram plotting an IR spectrum of a compound (16)

Anhydrous iron (III) chloride (0.38 g) (4×0.58=2.32 mmol) and nitrobenzene (10 mL) were put in a 25 mL four-necked flask and stirred under an argon (Ar) gas stream, while adamantyl EDTT (0.15 g) (0.58 mmol) and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (16) (0.09 g) (at a yield of 60%). FIG. 9 plots a FT-IR spectrum of the compound.

As in the case of Polymerization example 1, the obtained brown solid, which was the compound (16), was insoluble in organic solvents commonly used as electrolytic solutions.

Polymerization Example 9

Synthesis of Compound (26)

[Reaction formula 14]

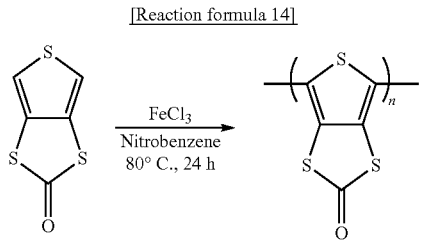

In reaction formula 14, n represents a natural number of 2 or greater.

Figure 10:
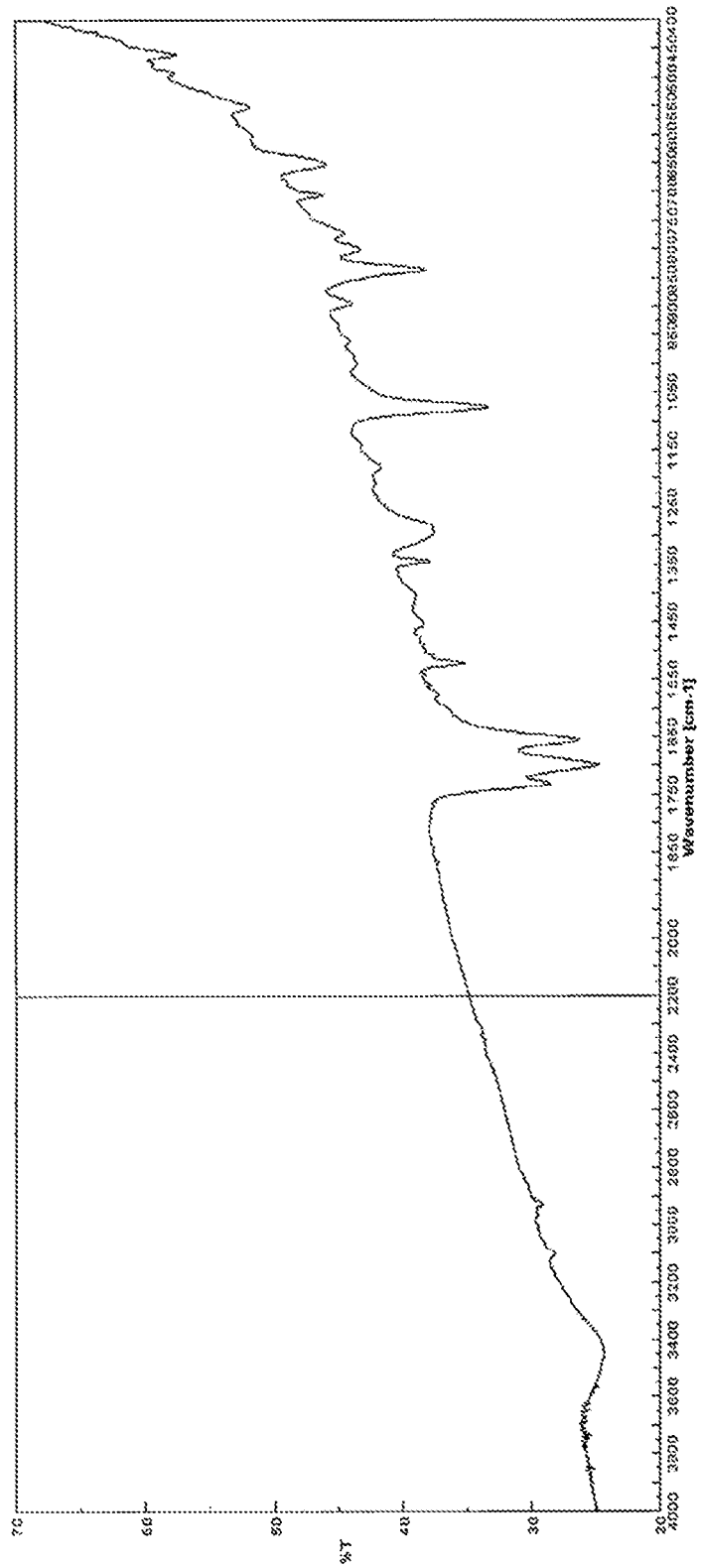
FIG. 10 is a diagram plotting an IR spectrum of a compound (26)

Anhydrous iron (III) chloride (0.51 g) (4×0.78=3.12 mmol) and nitrobenzene (10 mL) were put in a 25 mL four-necked flask and stirred under an argon (Ar) gas stream, while thieno[3,4-d]-1,3-dithiol-2-thione (0.15 g) (0.78 mmol) and nitrobenzene (4 mL) were dropped. After dropping was completed, the materials were stirred at 80 degrees C. for 24 hours and the obtained reaction solution was fed to methanol (260 mL). A precipitated solid was filtrated, washed with methanol (50 mL), and dried at reduced pressure at 80 degrees C. The obtained brown substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (26) (0.12 g) (at a yield of 80%). FIG. 10 plots a FT-IR spectrum of the compound.

As in the case of Polymerization example 1, the obtained brown solid, which was the compound (26), was insoluble in organic solvents commonly used as electrolytic solutions.

Polymerization Example 10

Synthesis of Compound (32)

[Reaction formula 15]

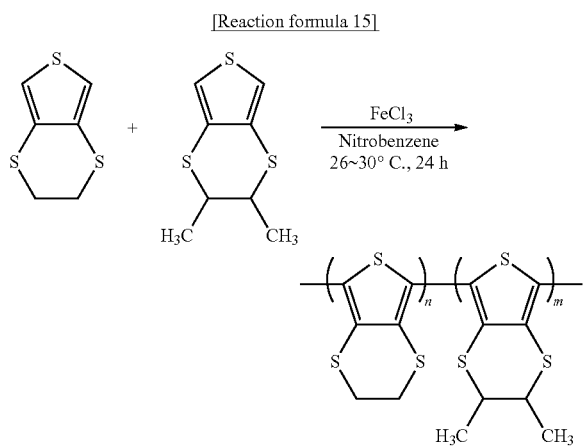

In reaction formula 15, n represents a natural number of 2 or greater and m represents a natural number of 2 or greater.

Figure 11:
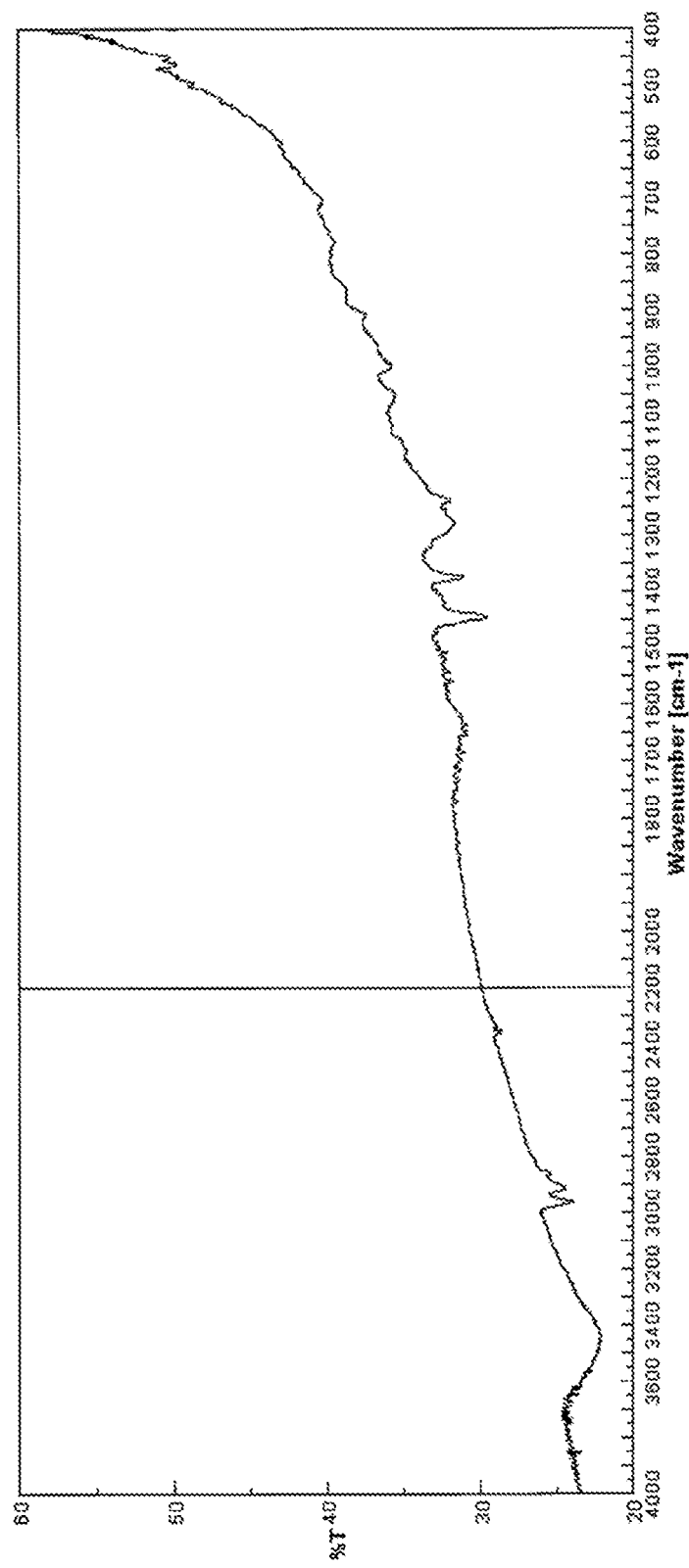
FIG. 11 is a diagram plotting an IR spectrum of a compound (32)

Anhydrous iron (III) chloride (0.44 g) (4×0.68=2.72 mmol) and nitrobenzene (10 mL) were put in a 25 mL four-necked flask and stirred under an argon (Ar) gas stream, while EDTT (0.06 g) (0.34 mmol), dimethyl EDTT (0.07 g) (0.34 mmol), and nitrobenzene (4 mL) were dropped. After dropping was completed, the materials were stirred at from 26 degrees C. through 30 degrees C. for 24 hours and the obtained reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (32) (0.104 g) (at a yield of 80%). FIG. 11 plots a FT-IR spectrum of the compound.

As in the case of Polymerization example 1, the obtained brown solid, which was the compound (32), was insoluble in organic solvents commonly used as electrolytic solutions.

Polymerization Example 11

Synthesis of Compound (36)

[Reaction formula 16]

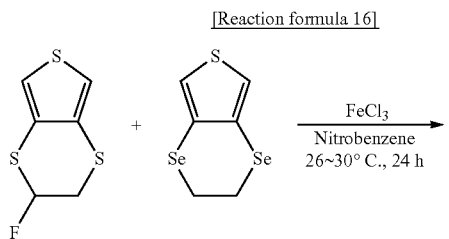

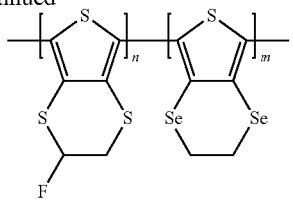

In reaction formula 16, n represents a natural number of 2 or greater and m represents a natural number of 2 or greater.

Figure 12:
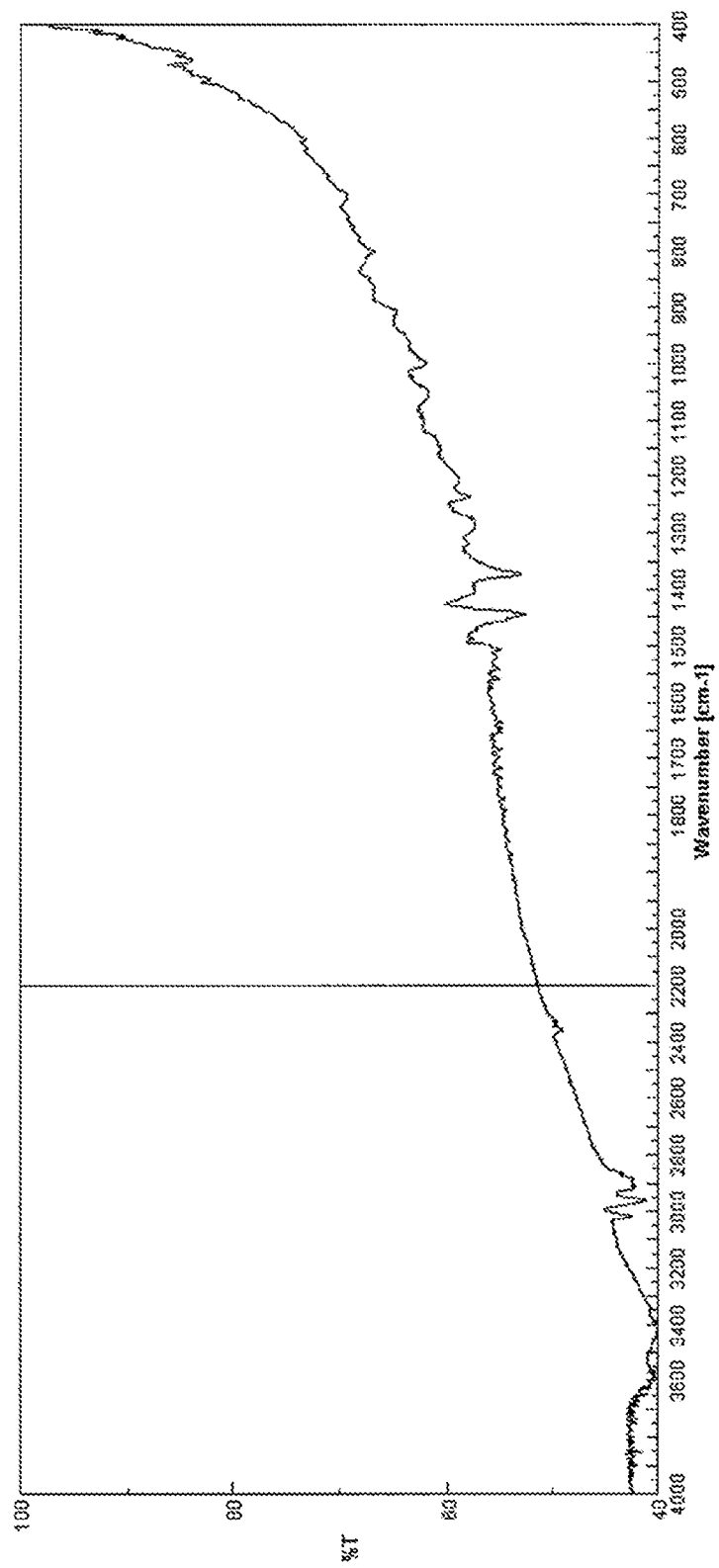
FIG. 12 is a diagram plotting an IR spectrum of a compound (36)

Anhydrous iron (III) chloride (0.14 g) (4×0.22=0.88 mmol) and nitrobenzene (10 mL) were put in a 25 mL four-necked flask and stirred under an argon (Ar) gas stream, while fluoro EDTT (0.04 g) (0.22 mmol), ethylene diseronothiophene (0.06 g) (0.22 mmol), and nitrobenzene (4 mL) were dropped. After dropping was completed, the materials were stirred at from 26 degrees C. through 30 degrees C. for 24 hours and the reaction solution was fed to methanol (260 mL). A precipitated solid was filtrated, washed with methanol (50 mL), and dried at reduced pressure at 80 degrees C. The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (36) (0.07 g) (at a yield of 70%). FIG. 12 plots a FT-IR spectrum of the compound.

As in the case of Polymerization example 1, the obtained brown solid, which was the compound (36), was insoluble in organic solvents commonly used as electrolytic solutions.

Polymerization Example 12

Synthesis of Compound (44)

[Reaction formula 17]

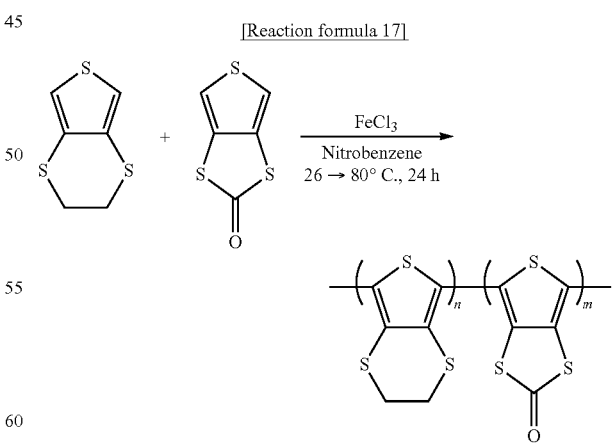

In reaction formula 17, n represents a natural number of 2 or greater and m represents a natural number of 2 or greater.

Anhydrous iron (III) chloride (0.42 g) (4×0.64=2.56 mmol) and nitrobenzene (10 mL) were put in a 25 mL four-necked flask and stirred under an argon (Ar) gas stream, while EDTT (0.06 g) (0.32 mmol), thione (0.06 g) (0.32 mmol), and nitrobenzene (4 mL) were dropped. After dropping was completed, the materials were stirred at from 26 degrees C. through 30 degrees C. for 10 minutes and further stirred at a raised temperature of 80 degrees C. for 24 hours, and the reaction solution was fed to methanol (260 mL). A precipitated solid was filtrated, washed with methanol (50 mL), and dried at reduced pressure at 80 degrees C.

Figure 13:
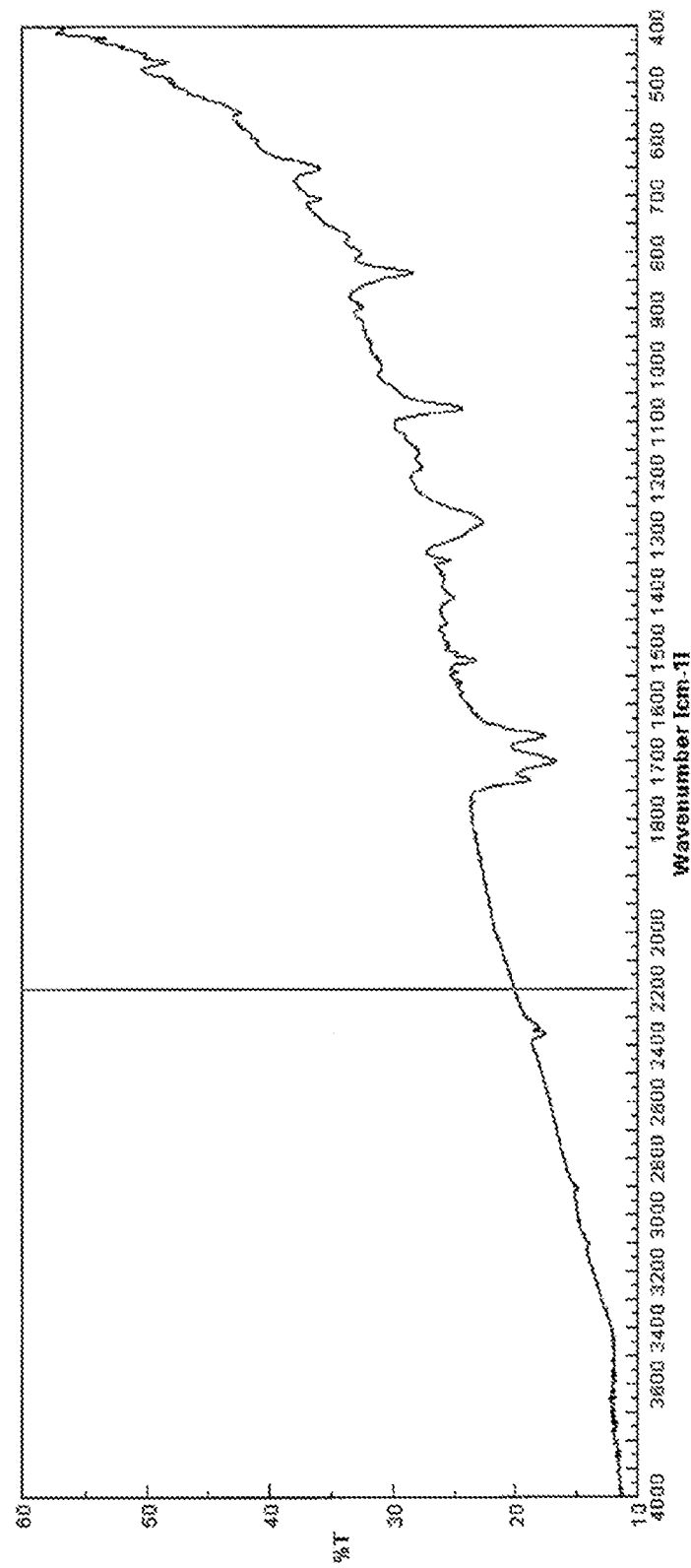
FIG. 13 is a diagram plotting an IR spectrum of a compound (44)

The obtained black substance was fed to a 50% by mass hydrazine monohydrate aqueous solution (50 mL), stirred for 1 day, filtrated, and washed by watering, and the obtained brown solid was again dried at reduced pressure at 80 degrees C. This brown solid was subjected to methanol extraction for 48 hours with a Soxlet's extractor using a cylindrical filter paper. After extraction, the cylindrical filter paper was dried at reduced pressure at 80 degrees C., to obtain a brown solid, which was the compound (44) (0.096 g) (at a yield of 80%). FIG. 13 plots a FT-IR spectrum of the compound.

As in the case of Polymerization example 1, the obtained brown solid, which was the compound (44), was insoluble in organic solvents commonly used as electrolytic solutions.

Example 1

The compound (2), graphite as a conduction assisting agent, and poly(vinylidene fluoride) as a binding agent were mixed. N-methylpyrrolidone was added to the mixture, and the materials were kneaded until the materials became entirely uniform, to obtain a black paste. The mass ratio for mixing was compound (2):graphite:binding agent=2:6:2. Subsequently, the obtained paste was uniformly coated on an aluminum foil, using a blade coating jig. The obtained coating film was put in a hot-air drier previously set to 110 degrees C. and dried for 5 minutes, to produce an electrode layer.

The obtained electrode layer was punched in a circular shape having a diameter of 16 mm, to obtain a circular positive electrode. This circular positive electrode was used as a working electrode, a Pt foil was used as a counter electrode, and a saturated calomel electrode was used as a reference electrode. A dichloromethane solution containing 1.0 mol/L of tetra-n-butylammonium perchlorate as an electrolyte was added in a beaker cell until all the electrodes were soaked. Subsequently, cyclic voltammetry measurement was performed at a sweeping rate of 1 mV/sec. FIG. 14 plots the measurement results of cyclic voltammetry of the compound (2).

Examples 2 to 12

Electrode layers 2 to 12 were produced in the same manner as in Example 1, except that the compound (2) used in Example 1 was changed to polythiophene derivatives denoted by Compound Nos. presented in the fields for Examples 2 to 12 in Table 1. Cyclic voltammetry measurement was performed in the same manner as in Example 1.

Comparative Example 1

A comparative electrode layer 1 was produced in the same manner as in Example 1, except that the compound (2) used in Example 1 was changed to a comparative compound 1 presented below. Cyclic voltammetry measurement was performed in the same manner as in Example 1.

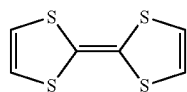

Comparative compound 1

Comparative Example 2

A comparative electrode layer 2 was produced in the same manner as in Example 1, except that the compound (2) used in Example 1 was changed to a comparative compound 2 presented below. Cyclic voltammetry measurement was performed in the same manner as in Example 1.

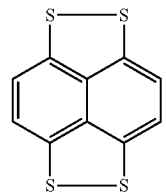

Comparative compound 2

TABLE 1

| | Compound No. | Result |
|---|---|---|
| Ex. 1 | 2 | Good |
| Ex. 2 | 3 | Good |
| Ex. 3 | 4 | Good |
| Ex. 4 | 5 | Good |
| Ex. 5 | 8 | Good |
| Ex. 6 | 10 | Good |
| Ex. 7 | 11 | Good |
| Ex. 8 | 16 | Good |
| Ex. 9 | 26 | Good |
| Ex. 10 | 32 | Good |
| Ex. 11 | 36 | Good |
| Ex. 12 | 44 | Good |
| Comp. Ex. 1 | Comparative compound 1 | Peak position shifted |
| Comp. Ex. 2 | Comparative compound 2 | Unstable |

From the results of Table 1, Examples 1 to 12 resulted in "good", with no large changes in peak position and intensity between the $1^{st}$ and $20^{th}$ measurements of cyclic voltammetry, and a stable progress of oxidation-reduction was observed. That is, it was revealed that the electrodes using the polythiophene derivative of the present invention as the active material had a good charge-discharge cyclic property.

As compared, both of Comparative Examples 1 and 2 had changes in peak position and intensity. Comparative Example 1 had a peak position shift and Comparative Example 2 had peak position instability.

Example 13

Production of Cell

The same electrode layer as in Example 1 was punched in a circular shape having a diameter of 16 mm, to obtain a circular positive electrode. In a glove box having a dew point temperature of −75 degrees C. or lower, the circular positive electrode, a polypropylene porous film separator having a diameter of 25 mm, a circular Li metal foil cathode having a diameter of 16 mm were laminated in this order in a stainless outer member, and an ethylene carbonate/diethyl carbonate mixture solution (at a mixing ratio by volume of 1:2) containing 1.0 mol/L of $LiPF_6$ electrolyte salt as an electrolyte was added. Finally, a cap, which was a stainless outer member, was put for hermetical sealing, to produce a cell of Example 13.

Examples 14 to 24

Production of Cells

Cells of Examples 14 to 24 were produced in the same manner as in Example 13, except that the compound (2) used in Example 13 was changed to polythiophene derivatives denoted by Compound Nos. presented in the fields for Examples 14 to 24 in Table 2.

Comparative Example 3

Production of Cell

A cell of Comparative Example 3 was produced in the same manner as in Example 13, except that the compound (2) used in Example 13 was changed to a comparative compound 3 presented below.

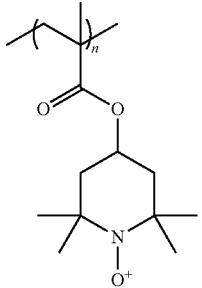

Comparative compound 3

In formula above, n represents a degree of polymerization, which is a natural number of 2 or greater.
—Evaluation of Cells—

Figure 15:
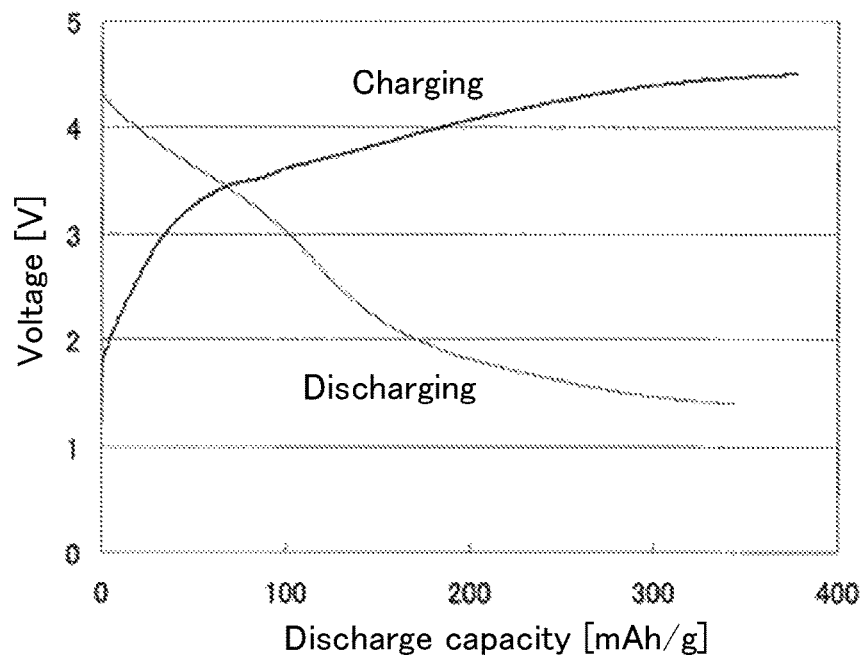
FIG. 15 is a diagram plotting voltage vs. discharge capacity of a cell of Example 13.

The cells of Examples 13 to 24 and Comparative Example 3 were charged/discharged under a constant current of 0.1 mA at a cutoff voltage of 4.5 V in charging and 1.5 V in discharging. As a result, discharge capacities per positive electrode active material presented in Table 2 were observed. FIG. 15 presents a diagram plotting voltage vs. discharge capacity of the cell of Example 13.

The discharge capacity per positive electrode active material was measured with an automatic cell evaluator (1024B-7V0.1A-4) available from Electrofield Co., Ltd.

TABLE 2

|  | Compound No. | Discharge capacity |
|---|---|---|
| Ex. 13 | 2 | 344 mAh/g |
| Ex. 14 | 3 | 327 mAh/g |
| Ex. 15 | 4 | 311 mAh/g |
| Ex. 16 | 5 | 299 mAh/g |
| Ex. 17 | 8 | 337 mAh/g |
| Ex. 18 | 10 | 304 mAh/g |
| Ex. 19 | 11 | 292 mAh/g |
| Ex. 20 | 16 | 307 mAh/g |
| Ex. 21 | 26 | 317 mAh/g |
| Ex. 22 | 32 | 340 mAh/g |

TABLE 2-continued

|  | Compound No. | Discharge capacity |
|---|---|---|
| Ex. 23 | 36 | 338 mAh/g |
| Ex. 24 | 44 | 323 mAh/g |
| Comp. Ex. 3 | Comparative compound 3 | 85 mAh/g |

From the results of Table 2, it was revealed that the cells of Examples using the polythiophene derivative of the present invention as the active material were higher by far in energy density than the cell of Comparative Example 3.

Furthermore, the cells of Examples 13 to 24 were charged and discharged repeatedly. As a result, it was confirmed that the cells were able to be charged and discharged 100 cycles or more and were operable as secondary cells.

Examples 25 to 36

—Bending Test of Electrode Layers—

Using each of the electrode layers produced in Examples 1 to 12, a bending test was performed according to a testing method described in JIS-K5600 5-1: bending resistance (cylindrical mandrel). The test was performed by changing the diameter of the mandrel from 10 mm to 2 mm at 1 mm intervals, and the mandrel diameter at which cracking occurred for the first time was recorded. Cracking was visually observed and evaluated according to criteria described below. The results are presented in Table 3. The greater the diameter of the mandrel, the poorer the flexibility.
[Evaluation Criteria]
  A: An electrode that was not cracked even at 2 mm
  B: An electrode that was cracked at from 3 mm through 5 mm
  C: An electrode that was cracked at from 6 mm through 8 mm.
  D: An electrode that was cracked at 9 mm or greater.

Comparative Examples 4 and 5

—Bending Test of Electrode Layers—
A bending test was performed in the same manner as in Examples 25 to 36, except that the electrode layer produced in Example 1 was changed to the comparative electrode layers 1 and 2 produced in Comparative Examples 1 and 2. The results are presented in Table 3.

TABLE 3

|  | Compound No. | Bending test result |
|---|---|---|
| Ex. 25 | 2 | B |
| Ex. 26 | 3 | B |
| Ex. 27 | 4 | C |
| Ex. 28 | 5 | A |
| Ex. 29 | 8 | A |
| Ex. 30 | 10 | B |
| Ex. 31 | 11 | B |
| Ex. 32 | 16 | A |
| Ex. 33 | 26 | B |
| Ex. 34 | 32 | B |
| Ex. 35 | 36 | C |
| Ex. 36 | 44 | B |
| Comp. Ex. 4 | Comparative compound 1 | D |
| Comp. Ex. 5 | Comparative compound 2 | D |

From the results of Table 3, it was revealed that the electrode layers of Examples 25 to 36 using the polythiophene derivative of the present invention as the active material were less likely to be cracked than the electrode layers of Comparative Examples 4 and 5.

Aspects of the present invention are as follows, for example.

<1> A polythiophene derivative including a repeating unit represented by general formula (1) below,

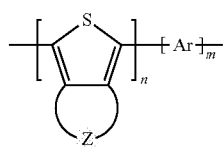
(1)

where in general formula (1), Z represents a group of atoms forming a 5-through 9-membered heterocycle containing a chalcogen element as a ring member, when the group of atoms contains a plurality of chalcogen elements, the chalcogen elements may be same or different, Ar represents an aromatic ring that may contain a substituent or an aromatic heterocycle that may contain a substituent, n represents a natural number of 2 or greater, and m represents 0 or a natural number of 2 or greater.

<2> The polythiophene derivative according to <1>, including a repeating unit represented by general formula (2) below,

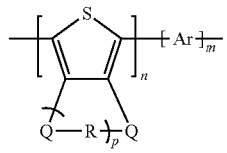
(2)

where in general formula (2), R represents a substituted or unsubstituted alkylene group or a substituted or unsubstituted branched alkylene group, p represents a natural number of 1 or greater, Q represents a chalcogen element, and Ar, n, and m represent same as in general formula (1).

<3> The polythiophene derivative according to <1>, including a repeating unit represented by general formula (3) below,

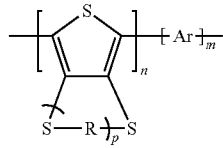
(3)

where in general formula (3), R represents a substituted or unsubstituted alkylene group or a substituted or unsubstituted branched alkylene group, p represents a natural number of 1 or greater, and Ar, n, and m represent same as in general formula (1).

<4> The polythiophene derivative according to <1>, including a repeating unit represented by general formula (4) below,

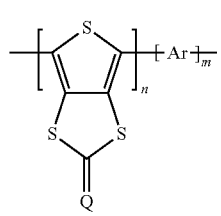
(4)

where in general formula (4), Q represents a chalcogen element, and Ar, n, and m represent same as in general formula (1).

<5> The polythiophene derivative according to any one of <1> to <4>, wherein Ar is a thiophene derivative.

<6> The polythiophene derivative according to <2> or <3>, wherein when m in general formula (2) or (3) is 0, R is a thiophene derivative containing a substituted alkylene group, a substituted branched alkylene group, or an unsubstituted alkylene group containing 3 or more carbon atoms.

<7> The polythiophene derivative according to <2> or <3>, wherein when m in general formula (2) or (3) is 0, p is a natural number of from 1 through 3.

<8> The polythiophene derivative according to any one of <1> to <7>, wherein n is from 10 through 100.

<9> The polythiophene derivative according to any one of <1> to <5> and <8>, wherein m is from 10 through 100.

<10> A secondary cell positive electrode active material including the polythiophene derivative according to any one of <1> to <9>.

<11> A secondary cell including:
a positive electrode;
a negative electrode;
an electrolyte; and
an organic compound that causes an oxidation-reduction reaction in at least either of a charging process and a discharging process, the organic compound being an electrode active material,
wherein the organic compound is the polythiophene derivative according to any one of <1> to <9>.

<12> The secondary cell according to <11>, wherein the secondary cell is a lithium ion secondary cell.

What is claimed is:
1. A polythiophene derivative embodied in an electrode active material of a secondary cell, the polythiophene derivative comprising
a repeating unit represented by general formula (3) below,

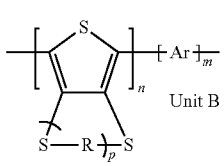
(3)

where in general formula (3), R is a substituted alkylene group, a substituted branched alkylene group, or an unsubstituted alkylene group that comprises 3 or more carbon atoms, p represents a natural number of 1 or greater and represents a cyclic compound of unit A, Ar represents an aromatic ring that may comprise a substituent or an aromatic heterocycle that may comprise a substituent and represents a cyclic compound of unit B, n represents a natural number of 2 or greater, and m represents a natural number of 2 or greater, wherein the cyclic compound of unit A and the cyclic compound of unit B are directly bonded to each other.

2. The polythiophene derivative according to claim 1, comprising a repeating unit represented by general formula (4) below,

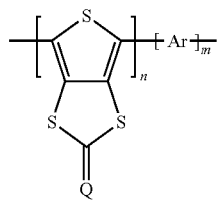

(4)

where in general formula (4), Q represents a chalcogen element, and Ar, n, and m represent same as in general formula (3).

3. The polythiophene derivative according to claim 1, wherein Ar is a thiophene derivative.

4. A polythiophene derivative embodied in an electrode active material of a secondary cell, the polythiophene derivative comprising:

a repeating unit represented by general formula (3) below,

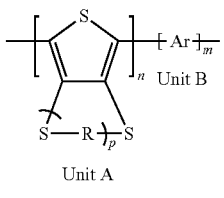

(3)

Unit A where in general formula (3), R is a substituted or unsubstituted alkylene group, or a substituted or unsubstituted branched alkylene group, p represents a natural number of 1 or greater and represents a cyclic compound of unit A, Ar represents an aromatic ring that may comprise a substituent or an aromatic heterocycle that may comprise a substituent and represents a cyclic compound of unit B, n represents a natural number of 2 or greater, and m represents 0 or a natural number of 2 or greater, wherein the cyclic compound of unit A and the cyclic compound of unit B are directly bonded to each other, and wherein when m in general formula (3) is 0, R is a substituted alkylene group, a substituted branched alkylene group, or an unsubstituted alkylene group that comprises 3 or more carbon atoms.

5. The polythiophene derivative according to claim 1, wherein p is a natural number of from 1 through 3.

6. The polythiophene derivative according to claim 1, wherein n is from 10 through 100.

7. The polythiophene derivative according to claim 1, wherein m is from 10 through 100.

8. A secondary cell positive electrode active material comprising the polythiophene derivative according to claim 1.

9. A secondary cell comprising:
a positive electrode;
a negative electrode;
an electrolyte; and
an organic compound that causes an oxidation-reduction reaction in at least either of a charging process and a discharging process, the organic compound being an electrode active material,
wherein the organic compound comprises the polythiophene derivative according to claim 1.

10. The secondary cell according to claim 9,
wherein the secondary cell comprises a lithium ion secondary cell.

11. A polythiophene derivative embodied in an electrode active material of a secondary cell, the polythiophene derivative comprising:

a repeating unit represented by general formula (3) below,

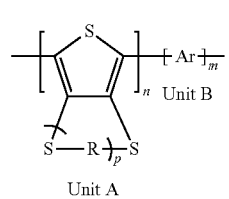

(3)

Unit A where in general formula (3), R is a substituted or unsubstituted alkylene group, or a substituted or unsubstituted branched alkylene group, p represents a natural number of 1 or greater and represents a cyclic compound of unit A, Ar represents an aromatic ring that may comprise a substituent or an aromatic heterocycle that may comprise a substituent and represents a cyclic compound of unit B, n represents a natural number of 2 or greater, and m represents 0 or a natural number of 2 or greater, wherein the cyclic compound of unit A and the cyclic compound of unit B are directly bonded to each other, wherein when m in general formula (3) is 0, R is a substituted alkylene group, a substituted branched alkylene group, or an unsubstituted alkylene group that comprises 3 or more carbon atoms, and wherein the substituent of the substituted alkylene group or the substituted branched alkylene group is an alkyl group, an alkoxy group, an aryl group, an aryloxy group, a halogen atom, a thioalkyl group, an arylthio group, an alkylamino group, or an arylamino group, and the alkyl group is a methyl group, an ethyl group, an isopropyl group, or a butyl group.

* * * * *